(12) United States Patent
Saito

(10) Patent No.: US 11,900,188 B2
(45) Date of Patent: Feb. 13, 2024

(54) PRINTER AND NON-TRANSITORY COMPUTER-READABLE MEDIUM STORING PROGRAM

(71) Applicant: BROTHER KOGYO KABUSHIKI KAISHA, Nagoya (JP)

(72) Inventor: Shingo Saito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/828,187

(22) Filed: May 31, 2022

(65) Prior Publication Data

US 2022/0379604 A1    Dec. 1, 2022

(30) Foreign Application Priority Data

May 31, 2021  (JP) .................. 2021-091622

(51) Int. Cl.
| | | |
|---|---|---|
| *G06K 15/10* | (2006.01) | |
| *B41J 11/00* | (2006.01) | |
| *B41J 3/01* | (2006.01) | |

(52) U.S. Cl.
CPC .............. *G06K 15/107* (2013.01); *B41J 3/01* (2013.01); *B41J 11/005* (2013.01)

(58) Field of Classification Search
CPC .... G06K 15/107; G06K 15/105; B41J 11/005
See application file for complete search history.

(56) References Cited

U.S. PATENT DOCUMENTS

| | | |
|---|---|---|
| 5,949,452 A | 9/1999 | Jones |
| 2016/0243862 A1 | 8/2016 | Yoshida |
| 2016/0271935 A1 | 9/2016 | Miyamoto |
| 2019/0232679 A1 | 8/2019 | Arakane |

FOREIGN PATENT DOCUMENTS

| | | |
|---|---|---|
| JP | H10157096 A | 6/1998 |
| JP | 2006027131 A | 2/2006 |
| JP | 2009143135 A | 7/2009 |
| JP | 2016153182 A | 8/2016 |
| JP | 2016175373 A | 10/2016 |
| JP | 2019130752 A | 8/2019 |

*Primary Examiner* — Julian D Huffman
(74) *Attorney, Agent, or Firm* — Scully, Scott, Murphy & Presser, PC

(57) ABSTRACT

There is provided a printer including: a printing part having: a conveyor configured to convey a medium in a conveying direction; a printing head having a plurality of nozzles from which an ink of a specified color is discharged and of which positions in the conveying direction are mutually different, the printing head being configured to discharge the ink from the plurality of nozzles to the medium so as to form dots in the medium; and a facing member configured to be capable of facing a print surface of the medium on an upstream side in the conveying direction with respect to the plurality of nozzles of the printing head; and a controller.

10 Claims, 13 Drawing Sheets

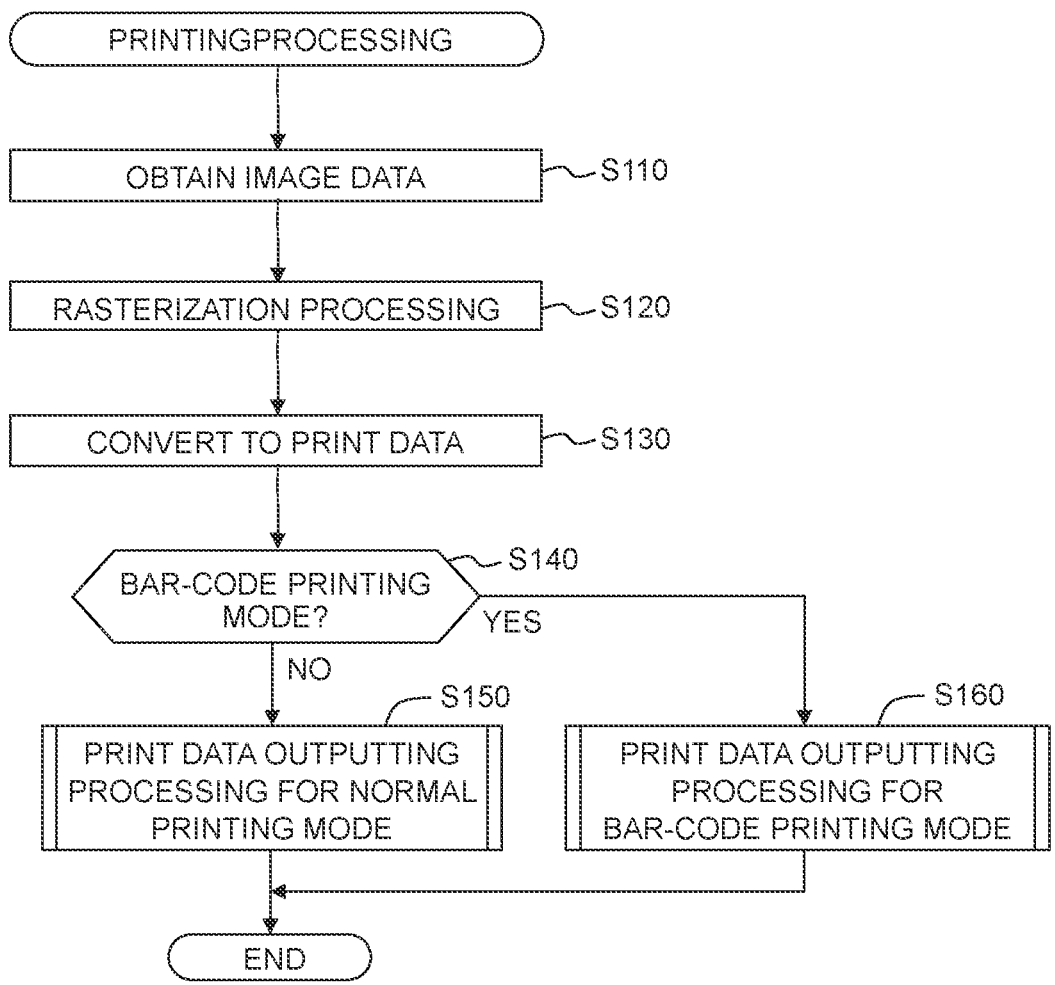

PATTERN DATA

RECORDING RATIO

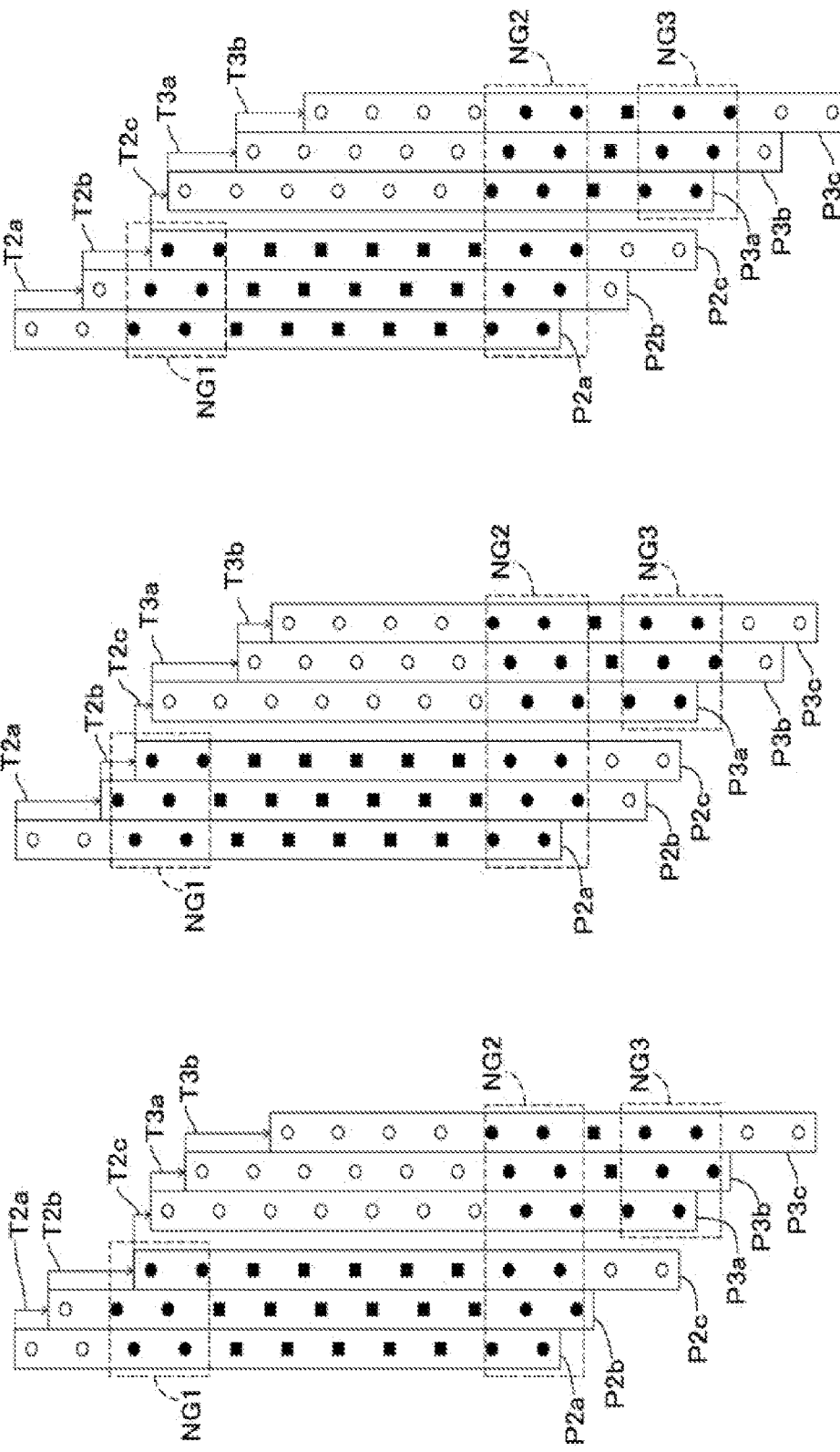

TOTAL OF CONVEYING AMOUNTS OF INTRA-SET
CONVEYANCES + MINIMUM VALUE OF SHEET
CONVEYANCE T2c < LENGTH H OF END AREA

PRINTER AND NON-TRANSITORY COMPUTER-READABLE MEDIUM STORING PROGRAM

CROSS REFERENCE TO RELATED APPLICATION

The present application claims priority from Japanese Patent Application No. 2021-091622 filed on May 31, 2021, the disclosure of which is incorporated herein by reference in its entirety.

BACKGROUND

The present specification relates to a controller of a printing part provided with a printing head which has a plurality of nozzles and a conveyor which is configured to convey a medium in a conveying direction relative to the printing head.

In a case that a publicly known printer performs printing by performing a pass processing a plurality of times (a plurality of pass processings), the publicly known printer performs, by two pass processings, the printing of a partial area in the vicinity of a boundary between band areas each of which is printed by one of the pass processings. With this, the publicly known printer suppress such a situation that a banding becomes conspicuous in the vicinity of the boundary between the band areas. This printer is provided with a pressing member arranged on the upstream side in the conveying direction with respect to the plurality of nozzles of the printing head and configured to press the sheet from a side of a print surface.

SUMMARY

The present specification discloses a technique of improving the image quality of a print image by a printing part provided with a facing member capable of facing a print surface of a sheet (for example, the pressing member as described above).

The technique disclosed in the present specification can be realized as an example of an aspect as follows.

According to an aspect of the present disclosure, there is provided a printer including: a printing part and a controller. The printing part includes: a conveyor configured to convey a medium in a conveying direction, a printing head having a plurality of nozzles from which an ink of a specified color is discharged and of which positions in the conveying direction are mutually different, the printing head being configured to discharge the ink from the plurality of nozzles to the medium so as to form dots in the medium, and a facing member configured to be capable of facing a print surface of the medium on an upstream side in the conveying direction with respect to the plurality of nozzles of the printing head. The controller is configured to cause the printing part to execute a partial printing of forming the dots by the printing head and a conveyance of the medium by the conveyor alternately and a plurality of times to thereby cause the printing part to print a print image. In a case that the controller causes the printing part to print the print image, the controller is configured to execute: causing the printing head to execute a first partial printing N times (N being an integer not less than 2), the first partial printing being the partial printing executed in a state that the medium faces the facing member, causing the conveyor to convey the medium by a first conveying amount, after causing the printing head to execute the first partial printing the N times, causing the printing head to execute a second partial printing the N times, after causing the conveyor to convey the medium by the first conveying amount, the second partial printing being the partial printing executed in the state that the medium faces the facing member, causing the conveyor to convey the medium by a second conveying amount, which is smaller than the first conveying amount, after causing the printing head to execute the second partial printing the N times, causing the printing head to execute a third partial printing the N times, after causing the conveyor to convey the medium by the second conveying amount, the third partial printing being the partial printing executed in a state that the medium is arranged at a specified position in the conveying direction at which a predetermined position, of an end part on the upstream side in the conveying direction of the medium, faces the facing member, causing the conveyor to convey the medium, after causing the printing head to execute the third partial printing the N times, and then, causing the printing head to execute a fourth partial printing the N times, the fourth partial printing being the partial printing executed in a state that the medium does not face the facing member. A first area printed by the first partial printing performed the N times includes a first normal area which is printed only by the first partial printing, and a first end area which is arranged on the upstream side in the conveying direction with respect to the first normal area and which is printed by both of the first partial printing and the second partial printing. A second area printed by the second partial printing performed the N times includes the first end area, a second normal area which is arranged on the upstream side in the conveying direction with respect to the first end area and which is printed only by the second partial printing, and a second end area which is arranged on the upstream side in the conveying direction with respect to the second normal area and which is printed by both of the second partial printing and the third partial printing. A third area printed by the third partial printing performed the N times includes the second end area and a third end area which is arranged on the upstream side in the conveying direction with respect to the second end area and which is printed by both of the third partial printing and the fourth partial printing. A fourth area printed by the fourth partial printing performed the N times includes the third end area and a fourth normal area, which is arranged on the upstream side in the conveying direction with respect to the third end area and which is printed only by the fourth partial printing. N pieces of a first raster line, which are adjacent to each other and which are included in a plurality of first raster lines within the first normal area and arranged in the conveying direction, are printed, respectively, by the first partial printing and the first partial printing which are mutually different from each other and performed separately from each other. N pieces of a second raster line, which are adjacent to each other and which are included in a plurality of second raster lines within the second normal area and arranged in the conveying direction, are printed, respectively, by the second partial printing and the second partial printing which are mutually different from each other and performed separately from each other. N pieces of a third raster line, which are adjacent to each other and which are included in a plurality of third raster lines within the third normal area and arranged in the conveying direction, are printed, respectively, by the third partial printing and the third partial printing which are mutually different from each other and performed separately from each other. N pieces of a fourth raster line, which are adjacent to each other and which are included in a plurality of fourth raster lines within the fourth normal area and arranged in the conveying direction, are printed, respectively, by the fourth partial printing and the fourth partial printing which are mutually different from each other and performed separately from each other. The controller is configured to execute: performing a (N−1) time of the conveyance of the medium each between the N times of the first partial printing, between the N times of the second partial printing, between the N times of the third partial printing, and between the N times of the fourth partial printing; and determining a conveying amount of the (N−1) time of the conveyance of the medium so that a number (quantity) of an upstream-side raster line which is included in a plurality of raster lines printable in the third partial printing performed the N times in a case that the second conveying amount is set to be a minimum value and which is arranged on the upstream side in the conveying direction with respect to a plurality of raster lines printable by the second partial printing performed the N times becomes to be not less than a number (quantity) of raster lines (to be) printed in the first end area.

According to the above-described configuration, the N times of the third partial printing are performed in the state that the medium is arranged at the specified position, namely, in the state that the predetermined position of the end part on the upstream side in the conveying direction of the medium faces the facing member. Thus, it is possible to perform the third partial printing in a state that the medium is stable (stabilized), thereby making it possible to improve the print quality. Here, there is sometimes such a case that the second conveying amount becomes small so as to perform the N times of the third partial printing in the state that the medium is located at the specified position. Further, according to the above-described configuration, the number (quantity) of the upstream-side raster line which is included in the plurality of raster lines printable in the third partial printing performed the N times in the case that the second conveying amount is set to be the minimum value and which is arranged on the upstream side in the conveying amount with respect to the plurality of raster lines printable by the second partial printing performed the N times becomes to be not less than the number (quantity) of the raster lines to be printed in the first end area. As a result, it is possible to print, on the upstream side in the conveying direction of the plurality of raster lines which are printable by the N times of the second partial printing, the raster lines of which number (quantity) is not less than the number (quantity) of the raster lines to be printed in the first end area, by the N times of the third partial printing. As a result the number of the raster line in the third end area which is printed by both of the N times of the third partial printing and the N times of the fourth partial printing to be not less than the number of the raster line in the first end area. Accordingly, it is possible to suppress the occurrence of such a situation that the banding is conspicuous which would have otherwise occurred in a case that the number of the raster line in the third end area cannot be secured. As described above, according to the above-described configuration, it is possible to improve the image quality of the print image by the printing part.

Note that the technique disclosed in the present specification can be realized in a various kinds of aspects; for example, the technique can be realized in aspects including: a printer; a method of controlling the printing part, a printing method; a computer program configured to realize the functions of these apparatuses and methods; a non-transitory, computer-readable medium storing the computer program therein; etc.

BRIEF DESCRIPTION OF THE DRAWINGS

FIG. 4 is a flowchart of a print processing.

FIGS. 11A, 11B and 11C are each an explanatory view of a partial printing set.

DETAILED DESCRIPTION

First Embodiment

<Configuration of Printer 200>

Figure 1:
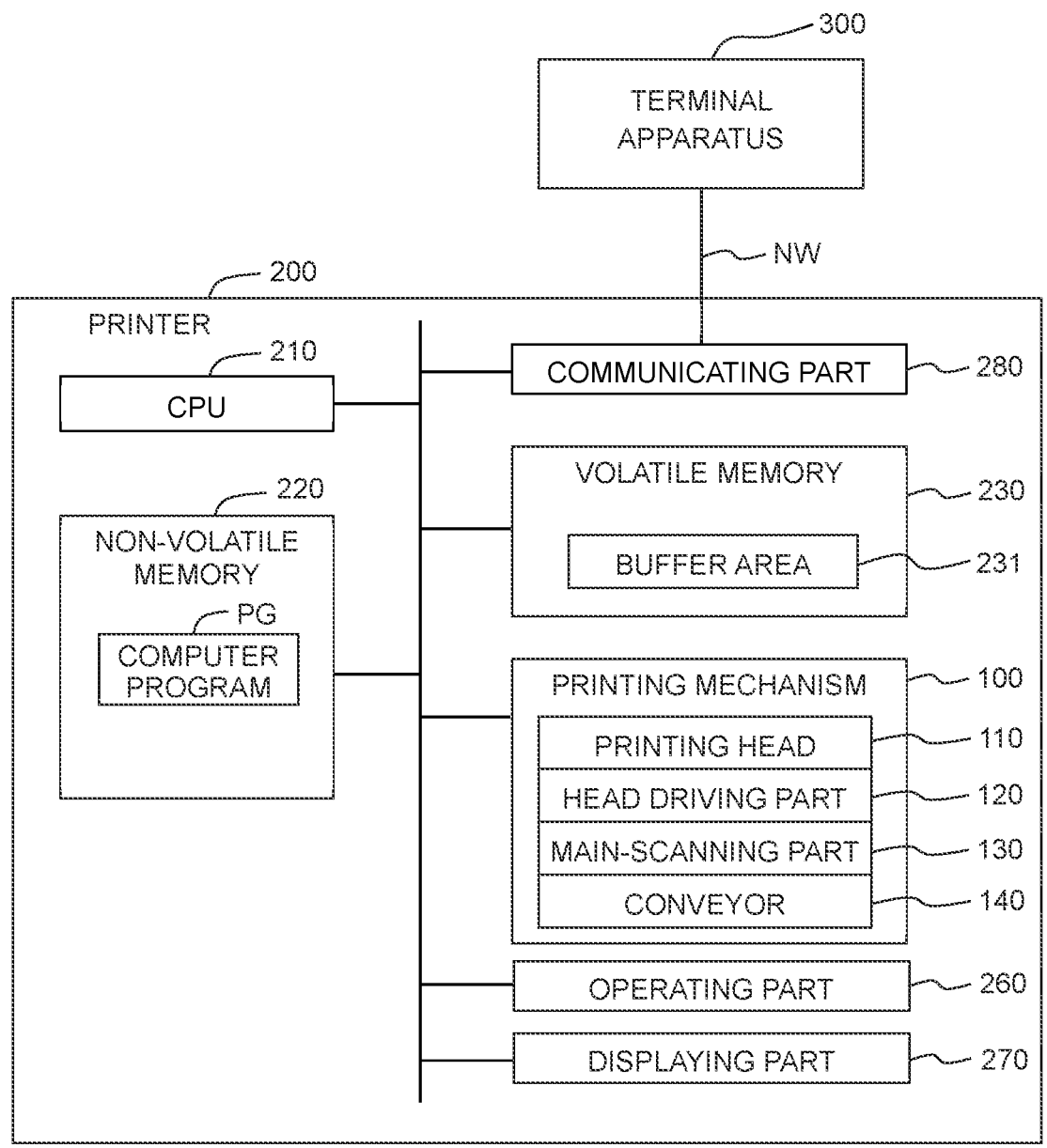
FIG. 1 is a block diagram indicating the configuration of a printer according to an embodiment.

A first embodiment of the present disclosure will be explained.

A printer 200 includes, for example, a printing mechanism 100 as a printing part, a CPU 210 as a controller, a non-volatile memory 220 such as a hard disk drive, etc., a volatile memory 230 such as a RAM, etc., an operating part 260 such as a button, a touch panel, etc., via which an operation from a user is obtained, a displaying part 270 such as a liquid crystal display, etc., and a communicating part 280. The communicating part 280 includes a wired or wireless interface configured to be connected to a network NW. The printer 200 is connected to an external apparatus, such as, for example, a terminal apparatus 300 of a user, via the communicating part 280 so that the printer 200 can communicate with the external apparatus 300.

The volatile memory 230 provides a buffer area 231 which temporarily stores various kinds of intermediate data generated in a case that the CPU 210 performs a processing. A computer program PG is stored in the non-volatile memory 220. In the present embodiment, the computer program PG is a control program for controlling the printer 200. The computer program PG may be provided by being stored in the non-volatile memory 220 at a time of shipment of the printer 200. Alternatively, the computer program PG may be provided in an aspect in which the computer program PG is downloaded from a server. Still alternatively, the computer program PG may be provided in an aspect in which the computer program PG is stored in a DVD-ROM, etc. The CPU 210 executes the computer program PG so as to, for example, control the printing mechanism 100, thereby executing a printing processing (to be described later on). With this, the CPU 210 prints an image on a medium (for example, paper sheet, sheet) by controlling the printing mechanism 100.

The printing mechanism 100 is capable of forming dots on a sheet (paper sheet) M by using inks (liquid droplets) of respective colors which are cyan (C), magenta (M), yellow (Y), and black (K) to thereby perform color printing. The printing mechanism 100 includes a printing head 110, a head driving part 120, a main-scanning part 130, and a conveyor 140.

Figure 2A:
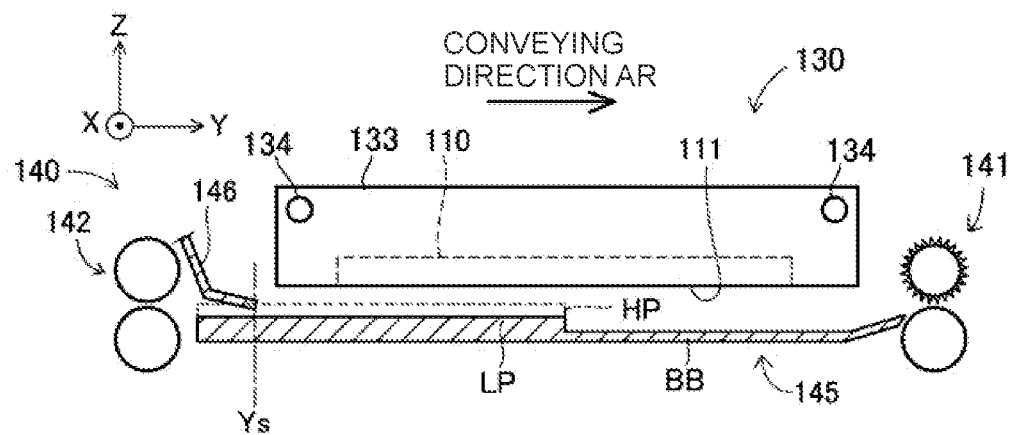
FIGS. 2A and 2B each depict the schematic configuration of a printing mechanism.

As depicted in FIG. 2A, the main-scanning part 130 includes a carriage 133 and a sliding shaft 134. The carriage 133 has the printing head 110 mounted or installed therein. The sliding shaft 134 holds the carriage 133 so that the carriage 133 can reciprocate in a main-scanning direction (X axis direction in FIG. 2A). The main-scanning part 130 uses power of a main scanning motor (not depicted in the drawings) to thereby cause the carriage 133 to reciprocate (also referred to as "scan" or "perform scanning") along the sliding shaft 134. This realizes main scanning in which the printing head 110 is caused to reciprocate in the main-scanning direction with respect to the sheet M.

The conveyor 140 conveys the sheet M in a conveying direction AR (+Y direction in FIGS. 2A and 2B) crossing the main-scanning direction while holding the sheet M. As depicted in FIG. 2A, the conveyor 140 includes an upstream roller pair 142, a downstream roller pair 141, a sheet table 145, and a plurality of pressing members 146. In the following description, an upstream side (−Y side) in the conveying direction AR is simply referred also to as an "upstream side", and a downstream side (+Y side) in the conveying direction AR is simply referred also to as a "downstream side".

The upstream roller pair 142 holds the sheet M on the upstream side (−Y side) with respect to the printing head 110, and the downstream roller pair 141 holds the sheet M on the downstream side (+Y side) with respect to the printing head 110. The sheet table 145 is arranged at a location which is between the upstream roller pair 142 and the downstream roller pair 141 and at which the sheet table 145 faces or is opposite to a nozzle formation surface 111 of the printing head 110. The downstream roller pair 141 and the upstream roller pair 142 are driven by a conveyance motor (not depicted in the drawings) to thereby convey the sheet M in the conveying direction AR.

The head driving part 120 (FIG. 1) supplies a driving signal to the printing head 110 while the main-scanning part 130 performs the main scanning of the printing head 110, thereby driving the printing head 110. The printing head 110 forms dots by ejecting or discharging the ink(s) on the sheet M, which is (being) conveyed by the conveyor 140, in accordance with the driving signal.

Figure 2B:
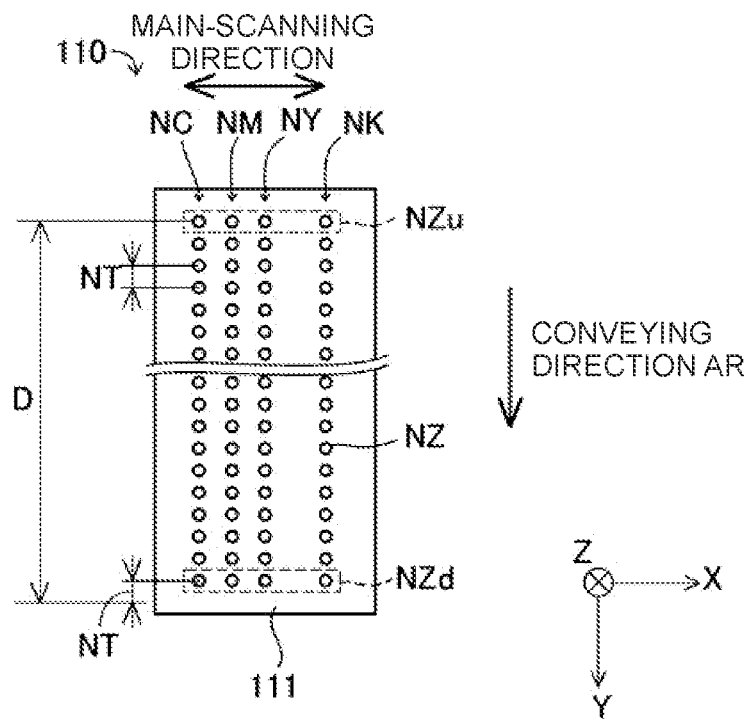

FIG. 2B depicts the configuration, of the printing head 110 as being seen from a −Z side (lower side in FIG. 2A). As depicted in FIG. 2B, a plurality of nozzle rows or arrays formed of a plurality of nozzles, that is, a plurality of nozzle rows NC, NM, NY, NK from which the inks of C, M, Y, K are ejected or discharged, respectively, are formed in the nozzle formation surface 111 of the printing head 110. Each of the plurality of nozzle rows include a plurality of nozzle NZ which are aligned (arranged side by side) in the conveying direction AR. The plurality of nozzles NZ have positions which are mutually different in the conveyance direction AR (+Y direction); and the plurality of nozzles NZ are arranged side by side in the conveying direction AR at a predefined nozzle interval NT therebetween. The nozzle interval NT is a length in the conveying direction AR between two nozzles NZ which are included in the plurality of nozzles NZ and which are adjacent to each other in the conveying direction AR. Among the plurality of nozzles NZ forming each of the plurality of nozzle rows, a nozzle NZ which is arranged at an upstream-most side (−Y side) is also referred to as an upstream-most nozzle NZu. Among the plurality of nozzles NZ forming each of the plurality of nozzle rows, a nozzle NZ which is arranged at the downstream-most side (+Y side) is also referred to as a downstream-most nozzle NZd. A length obtained by adding the nozzle interval NT to a length in the conveying direction AR from the upstream-most nozzle NZu to the downstream-most nozzle NZd is also referred to as a nozzle length D. The nozzle length D is represented by a number (quantity) of nozzles included in each of the nozzle rows, with the number (quantity) of the nozzles as the unit. Note that in an actual product, although there is such a case that nozzles in the vicinity of both ends in the conveying direction AR are not used for the printing, an explanation will be given, in the present embodiment, regarding a case of performing printing by using all the nozzles corresponding to the nozzle length D, as an example. In the present embodiment, nozzle(s) usable for the printing are referred to as "usable nozzle(s)".

The positions in the main-scanning direction (X direction in FIG. 2B) of the nozzle rows NC, NM, NY, NK are different from one another; the positions in the conveying direction AR (Y direction in FIG. 2B) of the nozzle rows NC, NM, NY, NK overlap with one another. In an example depicted in FIG. 2B, for example, the nozzle row NM is arranged in the +X direction with respect to the nozzle row NY from which Y ink is discharged.

Figure 3A:
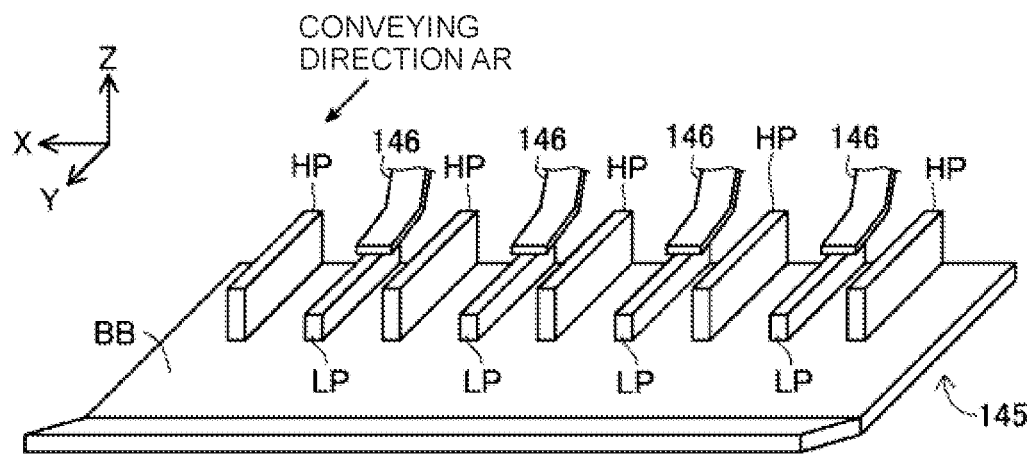
FIGS. 3A and 3B are each a perspective view of a sheet table and a plurality of pressing members.
Figure 3B:
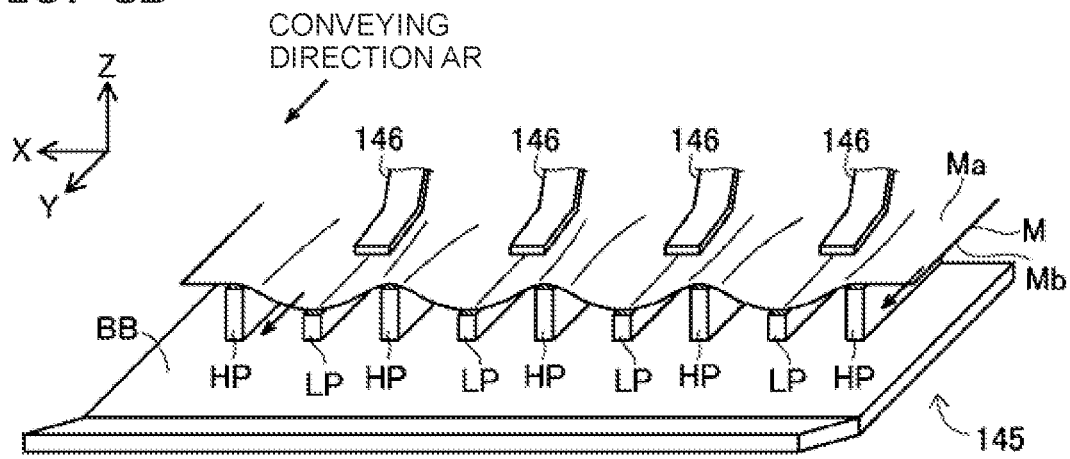

The conveyor 140 will be further explained, with reference to FIGS. 3A and 3B. FIGS. 3A and 3B are each a perspective view of the sheet table 145 and the plurality of pressing members 146. FIG. 3A depicts a state that the sheet M is not held, and FIG. 3B depicts a state that the sheet M is held. The sheet table 145 is provided with a plurality of high supporting members HP, a plurality of low supporting members LP and a flat plate BB.

The flat plate BB is a plate member which is substantially parallel to the main-scanning direction (X direction) and the conveying direction (+Y direction). An end on the upstream side (−Y side) of the flat plate BB is arranged in the vicinity of the upstream roller pair 142. An end on the downstream side (+Y side) of the flat plate BB is arranged in the vicinity of the downstream roller pair 141.

As depicted in FIG. 3A, the plurality of high supporting members HP and the plurality of low supporting members LP are arranged alternately along the X direction on the flat plate BB. Namely, each of the plurality of low supporting members LP is arranged between two high supporting members HP, among the plurality of high supporting members HP, which are adjacent to each of the plurality of low supporting members LP. Each of the high and low supporting members HP and LP is a rib extending along the Y direction. As depicted in FIG. 3A, an end on the upstream side (−Y side) of each of the plurality of high supporting members HP is arranged in an end on the upstream side of the flat plate BB. An end on the downstream side (+Y side) of each of the plurality of high supporting members HP is arranged in a central part in the Y direction of the flat plate BR The positions of both ends in the Y direction of each of the plurality of low supporting members LP are same as the positions of both ends in the Y direction of each of the plurality of high supporting members HP.

The plurality of pressing members 146 are arranged in positions on the +Z side of the plurality of low supporting members LP. Positions in the X direction of the plurality of pressing members 146 are same as the positions in the X direction of the plurality of low supporting members LP. Namely, the position in the X direction of each of the plurality of pressing members 146 is between two high supporting members HP, among the plurality of high supporting members HP, which are adjacent to each of the plurality of pressing members 146. Each of the plurality of pressing members 146 is a plate member which is inclined closer to one of the plurality of low supporting members LP further toward the +Y direction. The positions in the Y direction of the plurality of pressing members 146 are on the upstream side (−Y side) with respect to the printing head 110, and on the downstream side (+Y side) with respect to the upstream roller pair 142.

As depicted in FIG. 3B, at a time of conveying the sheet M, the plurality of high supporting members HP and the plurality of low supporting members LP face a side of a surface Mb which is on the opposite side to a print surface Ma, and support the sheet M from the side of the surface Mb. The plurality of pressing members 146 face the print surface Ma, and press the sheet M from the side of the print surface Ma. In such a manner, the plurality of high supporting members HP, the plurality of low supporting members LP and the plurality of pressing members 146 hold the sheet M in a state that the sheet M is deformed in a wave-like shape along the X direction (see FIG. 3B). Further, the sheet M is conveyed in the conveying direction (+Y direction) in the state of being deformed in the wave-like shape, at a position facing the nozzle formation surface 111 of the printing head 110. In a case that the sheet M is deformed to have the wave-like shape, it is possible to increase the rigidity of the sheet M against any deformation along the Y direction. As a result, it is possible to suppress occurrence of such a situation that the sheet M is deformed to curl along the Y direction and the sheet M is lifted from the sheet table 145 toward the side of the printing head 110, or that the sheet M hangs down toward the side of the sheet table 145. In a case that the sheet M is lifted, or that the sheet M hangs down, a position at which the dot(s) is (are) formed is deviated or shifted, which in turn might lead to any lowering in the image quality of a print image, for example, any lowering in the image quality of the print image due to, for example, a banding. Further, in a case that the sheet M is lifted, the sheet M might make contact with the printing head 110, and the sheet M might be dirtied.

Note that in a state that the end on the upstream side (an end on the −Y side) of the sheet M which is being conveyed is located on the upstream side (the −Y side) with respect to a position Ys in FIG. 2A, the sheet M is pressed by the pressing members 146. In a state that the end on the upstream side of the sheet M which is being conveyed is located on the downstream side (the +Y side) with respect to the position Ys in FIG. 2A, the sheet M is not pressed by the pressing members 146. In the state that the sheet M is pressed by the pressing members 146, the sheet M is held further stably than the state that the sheet M is not pressed by the pressing member 146, and thus a distance between the sheet M and the nozzle formation surface 111 becomes also stable. Accordingly, in order to stabilize a position at which the dot(s) is (are) formed to thereby make the image quality to be stable, it is preferred, as much as possible, to perform the printing in the state that the sheet M is pressed by the pressing members 146.

<Printing Processing>

The CPU 210 (FIG. 1) of the printer 200 executes a printing processing based on a printing instruction which is inputted by a user via the operating part 260. The printing instruction includes designation of image data which indicates an image to be printed. FIG. 4 is a flow chart of the printing processing. In the processing of step S110, the CPU 210 obtains image data designated by the printing instruction from the volatile memory 220. Instead of this, it is allowable that the printing instruction and the image data are obtained from the terminal apparatus 300. The image data to be obtained is image data having various formats such as JPEG-compressed image data, image data described in a page-description language, etc.

In the processing of step S120, the CPU 210 executes a rasterization processing with respect to the obtained image data to thereby generate RGB image data. The RGB image data is thus obtained as object image data of the present embodiment. The RGB image data is bitmap data in which a RGB value is included for each of pixels. The RGB value is, for example, a color value of a RGB color system which includes three component values that are red (R), green (G), and blue (B).

In the processing of step S130, the CPU 210 converts the RGB image data to print data. Specifically, the CPU 210 executes a color conversion processing and a half tone processing with respect to the RGB image data. The color conversion processing is a processing of converting the RGB values of a plurality of pixels included in the RGB image data to CMYK values, respectively. The CMYK values are color values of the CMYK color system including component values corresponding to the ink(s) which is (are) to be used in the printing (in the present embodiment, the component values of C, M, Y and K). The color conversion processing is executed, for example, by referring to a publicly known look-up table defining the corresponding relationship between the RGB values and the CYMK values. The halftone processing is a processing of converting the image data for which the color conversion processing has been executed to print data (also referred to as "dot data"). The print data is data indicating a dot formation state for each of the pixels, with respect to each of the respective color components of CMYK. The value of each of the pixels in the dot data indicates, for example, a dot formation state of two gradations which are "no dot" and "with dot", or a dot formation state of four gradations which are "no dot", "small dot", "medium dot", and "large dot". The halftone processing is executed by using a publicly known method such as the dithering method, the error diffusion method, etc.

In the processing of step S140, the CPU 210 judges as to whether or not the printing mode of a printing to be executed is a bar-code printing mode. In the present embodiment, the printing is executable in two kinds of printing mode which is the bar-code printing mode and a normal printing mode. The bar-code printing mode is a printing mode suitable for printing an image including a one-dimensional code such as a bar code, etc., and/or a two-dimensional code such as a "QR Code" (a registered trademark of DENSO CORPORATION). The normal printing mode is a printing mode suitable for printing a normal or ordinary image, for example, a letter (text), a photograph (picture), a drawing (graphic), etc. For example, since an instruction designating the printing mode is inputted by the user together with the printing instruction, the CPU 210 judges as to whether or not the printing mode is the bar-code printing mode, based on the printing instruction.

Instead of this, the CPU 210 may determine as to whether or not the one-dimensional code and/or the two-dimensional code is/are included in an image to be printed, by analyzing the image data obtained in the processing of step S110 or the print data obtained in the processing of step S130. In such a case, as a result of the analysis, in a case that the one-dimensional code and/or the two-dimensional code is/are included in the image to be printed, the printing mode of the printing to be executed is judged to be the bar-code printing mode; whereas in a case that the one-dimensional code or the two-dimensional code is not included in the image to be printed, the printing mode of the printing to be executed is judged to be the normal printing mode.

In a case that the printing mode of the printing to be executed is the normal printing mode (step S140: NO), the CPU 210 executes, in the processing of step S150, a print data outputting processing for the normal printing mode. In a case that the printing mode of the printing to be executed is the bar-code printing mode (step S140: YES), the CPU 210 executes, in the processing of step S160, a print data outputting processing for the bar-code printing. The print data outputting processing is a processing in which partial print data is generated per one time of a partial printing (to be described later on), a variety of control data is added to the partial print data, and then the partial print data is outputted to the printing mechanism 100. The control data includes data designating a conveying amount of sheet conveyance to be executed before the partial printing. In the print data outputting processing, the partial print data is output corresponding to a number of time(s) by which the partial printing is to be executed. Although the details of the print data outputting processing will be explained later on, in the print data outputting processing for the normal printing mode, an end area (to be described later on) is provided on an image to be printed, whereas in the print data outputting processing for the bar-code printing, any end area is not provided on an image to be printed.

By executing the printing processing, the CPU 210 is capable of causing the printing mechanism 100 to perform printing of a print image PI. Specifically, the CPU 210 controls the head driving part 120, the main-scanning part 130, and the conveyor 140 to alternately execute the partial printing and the sheet conveyance repeatedly a plurality of times to thereby perform the printing. In one time of the partial printing (one partial printing), in a state that the sheet M is stopped on the sheet table 145, an ink(s) is (are) discharged or ejected from the nozzles NZ of the printing head 100 to the sheet M while performing one time of the main scanning (one main scanning), thereby printing a part of the image to be printed on the sheet M. One time of the sheet conveyance is a conveyance in which the sheet M is conveyed in the conveyance direction AR by an amount corresponding to a conveying amount which is determined in the print data outputting processing.

Figure 5:
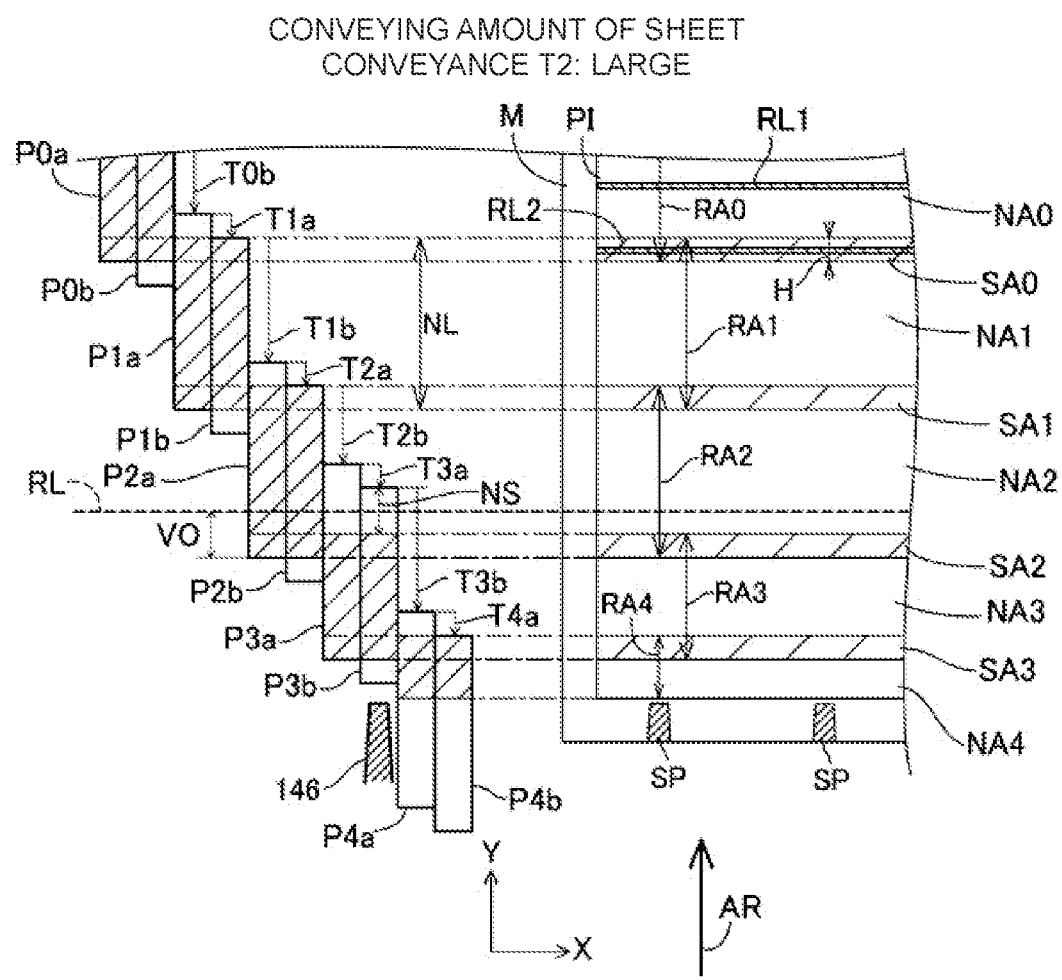
FIG. 5 is a first explanatory view of printing in a normal printing mode.

FIG. 5 is a first explanatory view of the printing in the normal printing mode of a first embodiment. FIG. 5 depicts an example of a print image PI (to be) printed on the sheet M. The print image PI includes a plurality of raster lines (e.g., RL1 in FIG. 5) which extend in the X direction in FIG. 5 (the main-scanning direction at the time of printing) and of which positions in the Y direction (the conveying direction AR at the time of printing) are mutually different. Each of the raster lines is a line in which a plurality of dots may be formed.

Further, FIG. 5 depicts head positions, namely, relative positions in the conveying direction AR of the printing head 110 with respect to the sheet M. Head positions P0a, P0b, P1a, P1b, P2a, P2b, P3a, P3b, P4a and P4b are head positions of ten times of the partial printing (ten partial printings) which are executed last among a plurality of times of partial printing (a plurality of partial printings).

In each of the head positions, a hatched range is a range in which a nozzle(s) NZ (also referred to as "used nozzle(s)") to be used for printing in a partial printing to be executed at each of the head positions is/are arranged in each of the head positions. The used nozzle(s) is/are a part or entirety of the usable nozzles.

In FIG. 5, the print image PI which is (to be) formed on the sheet M includes a plurality of normal areas (for example, areas NA0 to NA4 which are not hatched in FIG. 5), and a plurality of end areas (for example, hatched areas SA0 to SA3 in FIG. 5).

Each of the normal areas is printed by two times of the partial printing (partial printing performed twice, two partial printings) (so-called multi-pass printing). The two partial printings of printing one normal area is referred also to as a "partial printing set". For example, the normal area NA0 of FIG. 5 is printed by a partial printing set executed at head positions P0a and P0b. Similarly, the normal areas NA1, NA2, NA3 and NA4 are printed, respectively, by: a partial printing set executed at head positions P1a and P1b, a partial printing set executed at head positions P2a and P2b, a partial printing set executed at head positions P3a and P3b, and a partial printing set executed at head positions P4a and P4b.

Two raster lines which are adjacent each other among the plurality of raster lines arranged side by side in the conveying direction AR (two raster lines which are continuous in the conveying direction AR) within the normal area are printed, respectively, by mutually different (two) partial printings. For example, among the plurality of raster lines arranged side by side in the conveying direction AR within a certain normal area, an odd-numbered raster line is printed by a preceding partial printing constructing a partial printing set printing the certain normal area, and an even-numbered raster line is printed by a succeeding partial printing constructing the partial printing set printing the certain normal area With this, the print resolution in the conveying direction AR of the print image PI becomes two times that in a case wherein the normal area is printed only one time of the partial printing.

An area RA0 which is (to be) printed by the partial printing set executed at the head positions P0a and P0b includes the normal area NA0 and the end area SA0 on the upstream side (−Y side) with respect to the normal area NA0. An area RA1 which is (to be) printed by the partial printing set executed at the head positions P1a and P1b includes the normal area NA1, the end area SA0 located on the downstream side (+Y side) with respect to the normal area NA1, and the end area SA1 on the upstream side (−Y side) with respect to the normal area NA1. An area RA2 which is (to be) printed by the partial printing set executed at the head positions P2a and P2b includes the normal area NA2, the end area SA1 located on the downstream side (+Y side) with respect to the normal area NA2, and the end area SA2 on the upstream side (−Y side) with respect to the normal area NA2. An area RA3 which is (to be) printed by the partial printing set executed at the head positions P3a and P3b includes the normal area NA3, the end area SA2 located on the downstream side (+Y side) with respect to the normal area NA3, and the end area SA3 on the upstream side (−Y side) with respect to the normal area NA3. An area RA4 which is (to be) printed by the partial printing set executed at the head positions P4a and P4b includes the normal area NA4, and the end area SA3 located on the downstream side (+Y side) with respect to the normal area NA4.

In each of the normal areas, each of the respective raster lines within the area is printed only by one time of partial printing (partial printing performed once). For example, in each of the raster lines in a normal area NAk ("k" being an integer in a range of 0 to 4) in FIG. 5, the dots are formed only by one partial printing constructing the partial printing set performed in head positions Pka, Pkb. Namely, in each of the raster lines in the normal area NAk, dots of a specified color, for example, dots of C, are formed by using one piece of the nozzle NZ (one nozzle NZ) included in the nozzle row NC and corresponding to each of the raster lines.

In each of the end areas, each of the respective raster lines within the area is printed by two times of partial priming (partial printing performed twice). For example, in each of the raster lines in an end area SAI ("I" being an integer in a range of 0 to 3) in FIG. 5, the dots are formed by both of one partial printing constructing one partial printing set performed at a head positions PIa and PIb and one partial priming constructing one partial printing set performed at a head positions P(I+1)a and P(I+1)b. Namely, in each of the raster lines in the end area SAI, dots of a specified color, for example, dots of C, are formed by using two pieces of the nozzle NZ (two nozzles NZ) included in the nozzle row NC and corresponding to each of the raster lines.

A length H (see FIG. 5) in the conveying direction AR of the end area is, with the raster line being as an unit, for example, three to several tens, and is 8 (eight) in the present embodiment. In the present embodiment, since the nozzles NZ and the raster lines are corresponding to one another, making the raster line as the unit is same as making the number (quantity) of the nozzle(s) as the unit.

The reason for providing the end areas is explained below. It is assumed that a print image is formed only by images printed in the normal areas, without providing the end areas. In this case, an inconvenience which is referred to as a so-called banding such as a white streak and/or a black streak appearing at a boundary between two normal areas adjacent to each other in the conveying direction AR might be caused, due to any variation in the conveying amount of the sheet M, etc. The banding lowers the image quality of the print image PI. By providing the end area between two pieces of the normal area and by printing the image on the end area, it is possible to suppress the occurrence of the inconvenience referred to as the banding as described above. Since the dots on one raster line in the end area are formed by the partial printing performed twice, it is possible to suppress such a situation that all the dots on a certain one raster line are deviated uniformly with respect to all the dots on another raster line different from the certain raster line.

In the present embodiment, a partial printing set(s) which is (are) included in the plurality of partial printing sets and which is (are) different from the last partial printing set is performed in the state that the sheet M is pressed by the plurality of pressing members 146, namely, in the state that the print surface of the sheet M faces the pressing members 146. The last partial printing set is performed in the state that the sheet M is not pressed by the plurality of pressing members 146. In the present embodiment, in order that the printing is performed, as much as possible, in a state that the sheet M is pressed by the plurality of pressing members 146, a partial printing set which is immediately before the last partial printing set (which is first from the last partial printing set, penultimate partial printing set) is performed in a state that a specified position SP in the vicinity of the upstream end of the sheet M is pressed by the pressing members 146. As depicted in FIG. 5, the penultimate partial printing set is the partial printing set (to be) executed at the head positions P3a and P3b. In FIG. 5, the pressing members 146 indicated on the upstream side of the head position P3b are illustrated at a position in the conveying direction AR of pressing the specified position SP. With this, an image to be printed by the last partial printing set, namely, by the partial printing set performed at the head positions P4a and P4b of FIG. 5 can be made small. Accordingly, the last partial printing set can be executed by using only nozzles NZ which are included in the plurality of nozzles NZ and which are located on the downstream side, as a part of the plurality of nozzles NZ. As a result, although the last partial printing set is performed in a state that the sheet M is held only by the downstream roller pair 141, it is possible to make the length from the downstream roller pair 141 to the upstream end of the sheet M can be short at a time of performing the last partial printing set. Accordingly, it is possible to suppress such an inconvenience that the upstream end of the sheet M makes contact with the nozzle formation surface 111 of the printing head 110, and to stabilize a position at which the dots are formed (dot formation position). In the following, the head positions P3a and P3b at which a state that the pressing members 146 press the specified position SP of the sheet M is provided are referred also to an "end-pressing head position(s)".

FIG. 5 further depicts sheet conveyances T0b, T1a, T1b, T2a, T2b, T3a, T3b and T4a, with arrows, respectively. Each of the sheet conveyances T1a, T2a, T3a and T4a, is a sheet conveyance executed between two partial printings constructing a partial printing set (also referred to as a "intra-set conveyance"). A conveying amount of each of the sheet conveyances T1a, T2a, T3a and T4a, is also referred to as an intra-set conveying amount ΔTL. Usable nozzles in a preceding partial printing constructing the partial printing set are nozzles NZ which are included in the plurality of nozzles NZ corresponding to the nozzle length D and which are different from nozzles on the downstream side (+Y side in FIG. 5) of which number (quantity) corresponds to the intra-set conveying amount ΔTL. Usable nozzles in a succeeding partial printing constructing the partial printing set are nozzles NZ which are included in the plurality of nozzles NZ corresponding to the nozzle length D and which are different from nozzles on the upstream side (−Y side in FIG. 5) of which number (quantity) corresponds to the intra-set conveying amount ΔTL. A maximum length NL in the conveying direction AR printable in one partial printing set (namely, a length in the conveying direction AR of a range in which the usable nozzles are located; see FIG. 5) is (2D−ΔTL), with the raster line as the unit.

The sheet conveyance T0b is a sheet conveyance performed immediately before the partial printing set executed at the head positions P1a, P1b. The sheet conveyance T1b is a sheet conveyance performed immediately before the partial printing set executed at the head positions P2a, P2b; the sheet conveyance T2b is a sheet conveyance performed immediately before the partial printing set executed at the head positions P3a, P3b; and the sheet conveyance T3b is a sheet conveyance performed immediately before the partial printing set executed at the head positions P4a, P4b. A conveying amount of each of the sheet conveyances T0b, T1b, T2b and T3b is also referred to as a "prior-set conveying amount TL".

The prior-set conveying amount TL varies or changes depending on a nozzle shift amount NS (to be described later on), as will be described later in an explanation of a print data outputting processing (FIGS. 6A and 6B), and a minimum amount TLmin of the prior-set conveying amount TL is represented with the raster line as the unit, and is 1 (one) in the present embodiment. The minimum amount TLmin may be made to be a value greater than 1 (one) (for example, 2, 3, 5). The intra-set conveying amount ΔTL is, in the present embodiment, a value obtained by deducting the minimum amount TLmin of the prior-set conveying amount TL from a width H in the conveying direction AR of each of the end areas SA0 to SA3 (ΔTL=(H−TLmin)). The intra-set conveying amount ΔTL is a fixed value with the raster line as the unit, and set to be an odd number. As described above, in the present embodiment, since the width H in the conveying direction AR of each of the end areas SA0 to SA3 is "8" and the minimum value TLmin is "1", the intra-set conveying amount ΔTL is "7".

<Print Data Outputting Processing for Normal Printing Mode>

Figure 6A:
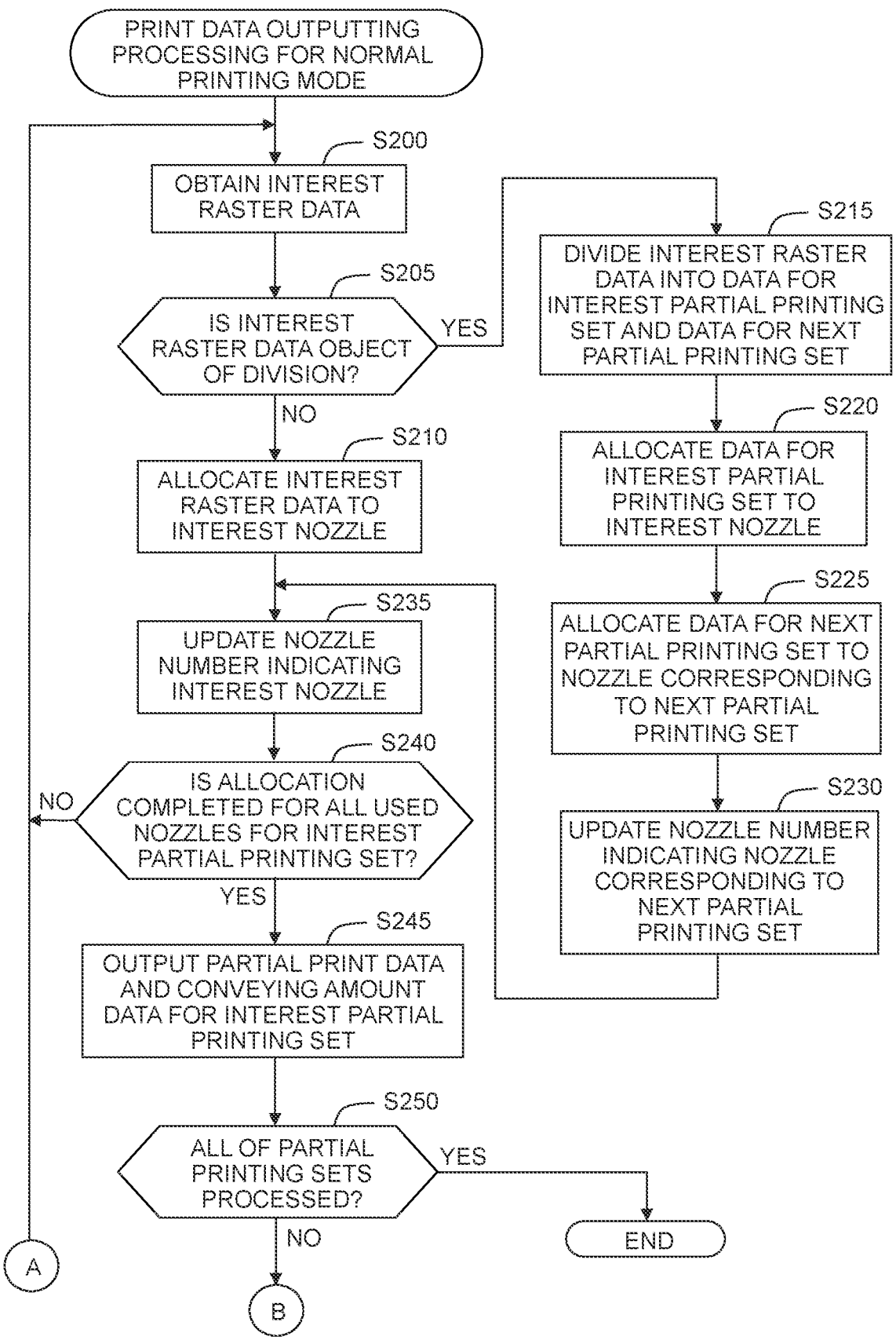
FIGS. 6A and 6B depict a flowchart of a print data outputting processing for the normal printing mode.
Figure 6B:
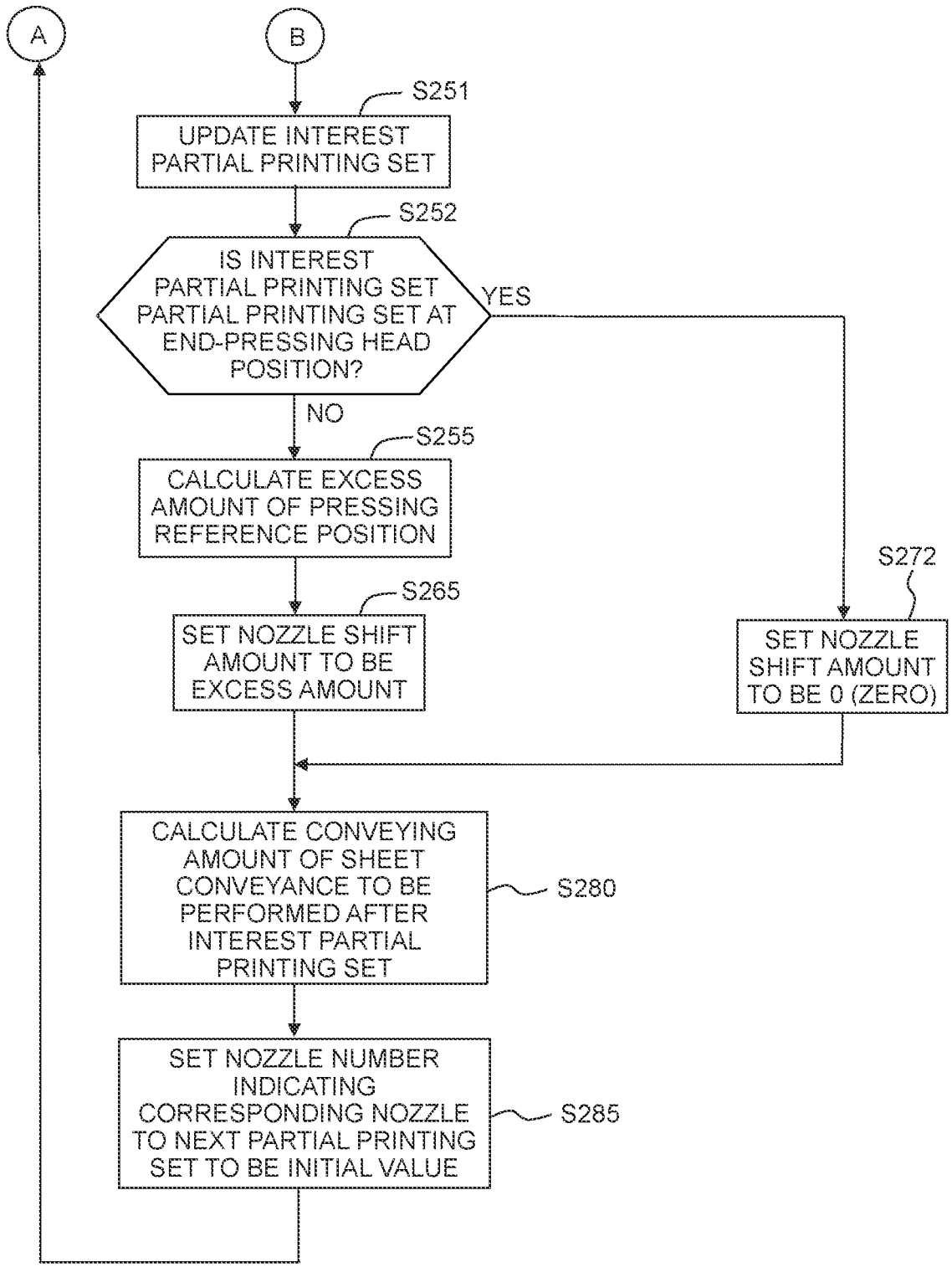

Next, the print data outputting processing for the normal printing mode in the processing of step S150 of FIG. 4 will be explained. As described above, the print data outputting processing is a processing of generating the partial print data per each of (one time of) the partial printing by using the print data generated in the processing of step S130, of adding the variety of kinds of control data to the partial print data, and then of outputting the partial print data to the printing mechanism 100. FIGS. 6A and 6B is a flow chart of the print data outputting processing for the normal printing mode.

The print data generated in the processing of step S130 of FIG. 4 indicates the print image PI (FIG. 5) which is to be printed. Accordingly, the print data includes a plurality of pieces of raster data each of which corresponds to one of a plurality of raster lines included in the print image PI.

In the processing of step S200, the CPU 210 obtains raster data (hereinafter referred also to as "interest raster data"), among the plurality of pieces of raster data, which corresponds to one interest raster line. The interest raster line is included in the print image PI, and is selected sequentially one by one, from the downstream side in the conveyance direction AR at the time of printing (+Y side in FIG. 5), among the plurality of raster lines arranged side by side in the conveying direction AR.

Here, a partial printing set by which the interest raster line is printed is also referred to as an interest partial printing set. Note that, however, in a case that the interest raster line is to be printed by two times of the partial printing set, namely, in a case that the interest raster line is arranged within an end area, a partial printing set included in the two times of the partial printing set and which is executed first is defined as the interest partial printing set. For example, in a case that the raster lines RL1 and RL2 in FIG. 5 are each the interest raster line, the interest partial printing set is a partial printing set which is performed at the head position P0a, P0b (FIG. 5). A nozzle NZ which is used for forming dots on the interest raster line in the interest partial printing set is referred also to as an "interest nozzle". For example, in a case that a raster line which is to be processed first, namely, a raster line arranged on the downstream-most side in the print image PI is the interest raster line, the interest nozzle is a nozzle NZ which is arranged on the downstream-most side among the usable nozzles in the interest partial printing set.

In the processing of step S205, the CPU 210 judges as to whether or not the interest raster data is an object of division. In a case that the interest raster line is arranged within an end area, in other words, in a case that the interest nozzle is a predetermined piece (in the present embodiment, 8 pieces) of nozzle NZ which are included in the usable nozzles in the interest partial printing set and which are arranged at an end on the upstream side, the interest raster data is judged to be the object of division. In a case that the interest raster line is arranged within a normal area, the interest raster data is judged not to be the object of division.

In a case that the interest raster data is not the object of division (step S205: NO), namely, in a case that the interest raster line is arranged within the normal area, the CPU 210 allocates, in the processing of step S210, the interest raster data to the interest nozzle. The interest nozzle at the time of starting the print data outputting processing is a nozzle NZ which is located at the downstream end among the usable nozzles in the interest partial printing set.

In a case that the interest raster data is the object of division (step S205: YES), namely, in a case that the interest raster line is arranged within the end area, the CPU 210 divides, in the processing of step S215, the interest raster data into data for the interest partial printing set and data for a partial printing set which is to be performed next to the interest partial printing set (next partial printing set).

Figure 7A:
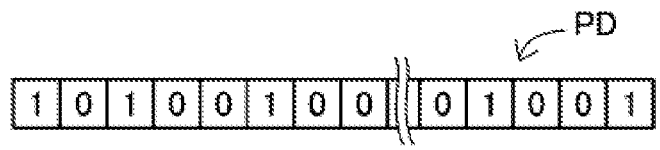
FIG. 7A is a view depicting division pattern data PD and FIG. 7B is a view depicting recording ratios of partial printings executed at head positions P0 to P2.
Figure 7B:
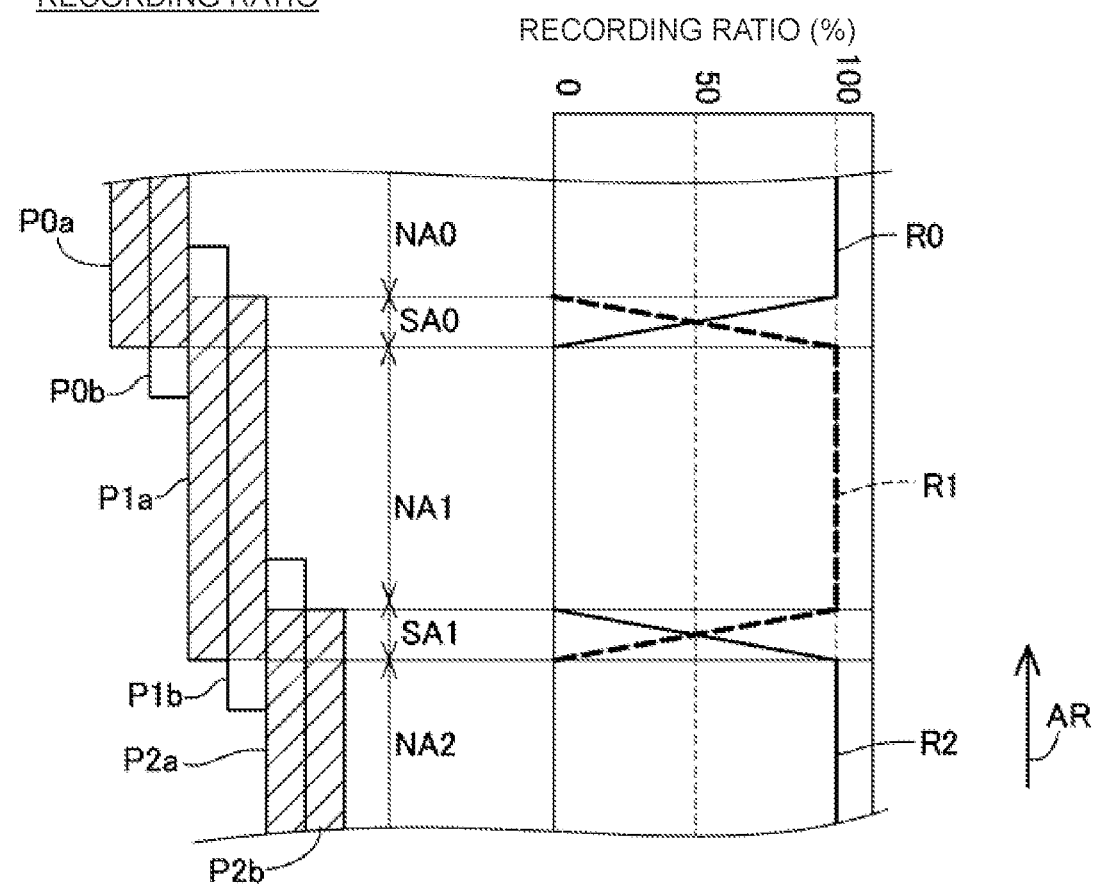

Specifically, the CPU 210 obtains division pattern data PD corresponding to the interest raster line. FIG. 7A is a view depicting the division pattern data PD, and FIG. 7B is a view depicting recording ratios of the partial printings executed in the head positions P0 to P2, respectively. As depicted in FIG. 7A, the division pattern data PD is binary data having values corresponding to the pixels, respectively, of the interest raster line. A value "0 (zero)" of the division pattern data PD indicates that a dot corresponding to a certain pixel is to be formed in the interest partial printing set. A value "1 (one)" of the division pattern data PD indicates that the dot corresponding to the certain pixel is to be formed in a partial printing set which is to be executed next to the interest partial printing set.

Here, the recording ratio R0 in FIG. 7B is recording ratio of the partial printing set executed at the head positions P0a, P0b. The recording ratio R1 is recording ratio of the partial printing set executed at the head positions P1a, P1b. The recording ratio R2 is recording ratio of the partial printing set executed at the head positions P2a, P2b. FIG. 7B indicates the respective recording ratios R0, R1 and R2 with respect to positions in the conveyance direction AR, respectively. In a range in the conveyance direction AR corresponding to the normal area NA0, the recording ratio R0 is 100%. Similarly, in ranges in the conveyance direction AR corresponding to the normal areas NA1 and NA2, respectively, the recording ratios R1 and R2 are each 100%.

In a range in the conveyance direction AR corresponding to the end area SA0, the recording ratio R0 is linearly reduced toward the upstream side (the lower side in FIG. 7B) of the conveyance direction AR. In the range in the conveyance direction AR corresponding to the end area SA0, the recording ratio R1 is linearly reduced toward the downstream side (the upper side in FIG. 7B) of the conveyance direction AR. In the range in the conveyance direction AR corresponding to the end area. SA0 (FIG. 5), a sum of the recording ratio R0 and the recording ratio R1 is 100%. This is similarly applicable also to the recording ratios R1 and R2 in a range in the conveyance direction AR corresponding to the end area SA1.

The division pattern data PD is generated so that the above-described recording ratios are realized depending on the position in the conveyance direction AR of the interest raster line in the end area. The CPU 210 divides, according to the division pattern data PD, the interest raster data into the data for the interest partial printing set and the data for the next partial printing set.

In the processing of step S220, the CPU 210 allocates the data for the interest partial printing set to the interest nozzle. In the processing of step S225, the CPU 210 allocates the data for the next partial printing set to a nozzle corresponding to the next partial printing set (corresponding nozzle).

Here, the corresponding nozzle is a nozzle NZ to be used for forming the dots on the interest raster line in the next partial printing set. The corresponding nozzle at a time of starting the print data outputting processing is a nozzle NZ on the downstream end of the usable nozzles of the next partial printing set. For example, in a case that the raster line RL2 in FIG. 5 is the interest raster line, the corresponding nozzle is a nozzle NZ located at an end on the downstream side (+Y side in FIG. 5) among the usable nozzles in the head position P1a, P1b.

In the processing of step S230, the CPU 210 updates a number indicating the corresponding nozzle of the next partial printing set. Namely, the CPU 210 changes the number indicating the corresponding nozzle to a number indicating a nozzle NZ which is on the upstream side, only by one, with respect to the current corresponding nozzle.

In the processing of step S235, the CPU 210 updates a number indicating the interest nozzle. Namely, the CPU 210 changes the number indicating the interest nozzle to a number indicating a nozzle NZ which in on the upstream side, only by one, with respect to the current interest nozzle.

In the processing of step S240, the CPU 210 judges as to whether or not the raster data is allocated to all the used nozzles in the interest partial printing set (all of used nozzles in two times of the partial printing, namely in two partial printings). Specifically, in a case that the number indicating the interest nozzle after the update exceeds the number indicating a nozzle which is on the upstream-most side among the used nozzles, the CPU 210 judges that the raster data has been allocated to all the used nozzles. In a case that there is a used nozzle to which the raster data has not been allocated (step S240: NO), the CPU 210 returns to the processing of step S200.

In a case that the raster data has been allocated to all of the used nozzles (step S240: YES), the CPU 240 outputs, in the processing of step S245, partial print data for the two partial printings constructing the interest partial printing set, and conveying amount data for two times of conveyance (two conveyances) to the printing mechanism 100. The partial print data is a raster data group allocated to the used nozzles. The conveying amount data is control data indicating the conveying amount. The conveying amount data for the two conveyances includes the prior-set conveying amount TL of the sheet conveyance to be executed immediately before the interest partial printing set, and the intra-set conveying amount ΔTL. The intra-set conveying amount ΔTL is the fixed value (is "7" in the present embodiment), as described above.

In a case that the interest partial printing set is a foremost partial printing set, which is the partial printing set performed first or foremost, the prior-set conveying amount TL is determined such that a position, on the sheet M, at which the downstream end of the print image PI is to be printed, and a position of a nozzle NZ which is located on the downstream end among the used nozzles in the interest partial printing set are coincident with each other. In a case that the interest partial printing set is a second partial printing set, the prior-set conveying amount TL is a value obtained by deducting a number (quantity) of raster line(s) corresponding to the end area and the conveying amount ΔTL from the maximum length NL in the conveying direction AR which is printable in one partial printing set. In the present embodiment, since the maximum length NL is (2D−ΔTL) and the number (quantity) of the raster lines of the end area is the length H in the conveying direction AR of the end area, the prior-set conveying amount TL determined in a case that the interest partial printing set is the second partial printing set is TL=(2D−H−2ΔTL). This conveying amount is previously determined on a premise that the head position of the second partial printing set will not become to be the end-pressing head position. In a case that the interest partial printing set is the third partial printing set and thereafter, the prior-set conveying amount TL is determined in the processing of step S280 which will be described later on. In a case that the printing mechanism 100 receives the partial print data for the two partial printing sets and the conveying amount data for the two conveyances, the printing mechanism 100 executes the sheet conveyance by an amount corresponding to the prior-set conveying amount TL indicated by the conveying amount data, and then executes the first partial printing by using the partial print data. Further, the printing mechanism 100 executes the sheet conveyance by the amount corresponding to the intra-set conveying amount ΔTL indicated by the conveying amount data, and then executes the second partial priming by using the partial print data. In such a manner, the two partial printings constructing the interest partial printing set are executed.

In the processing of step S250, the CPU 210 judges as to whether or not all of the partial printing sets have been processed. In a case that all of the partial printing sets have been processed (step S250: YES), the CPU 210 ends the print data outputting processing. In a case that all of the partial printing sets have not been processed (step S250: NO), the CPU 210 updates the interest partial printing set in the processing of step S251. Namely, the CPU 210 makes the interest partial printing set to be a next partial printing set next to the current interest partial printing set. Specifically, the number indicating the corresponding nozzle of the next interest partial printing set at the current point of time is set newly to be the number indicating the interest nozzle. The number indicating the corresponding nozzle of the next interest partial printing set at the current point of time is made to be a number indicating a nozzle on the downstream end in the normal area. For this reason, the number indicating a new interest nozzle is set to be the number indicating a nozzle on the downstream end in the normal area.

In the processing of step S252, the CPU 210 judges as to whether or not the interest partial printing set is a partial printing set which is to be executed at the end-pressing head position. In the example of FIG. 5, in a case that the interest partial printing set is the partial printing set which is to be executed at the head positions P3a, P3b, the interest partial printing set is judged to be the partial printing set which is to be executed at the end-pressing head position. In a case that the interest partial printing set is not the partial printing set which is to be executed at the end-pressing head position (step S252: NO), the CPU 210 proceeds the processing to step S255.

In the processing of step S255, the CPU 210 calculates an excess amount VO of a pressing reference position RL at the interest partial printing set. The excess amount VO indicates a length from the pressing reference position RL to an upstream-most nozzle NZ which is a nozzle NZ on the upstream-most side among the usable nozzle at the head position in the interest partial printing set, in a case that the upstream-most nozzle NZ is arranged on the upstream side with respect to the pressing reference position RL. The pressing reference position RL (FIG. 5) is a position in the conveying direction AR determined on the sheet M. In a case that the upstream-most nozzle NZ in the interest partial printing set is arranged on the upstream side with respect to the pressing reference position RL, the partial printing set next to the interest partial printing set is executed at the end-pressing head position (the head positions P3a, P3b of FIG. 5). In the example of FIG. 5, in a case that the partial printing set to be executed at the head positions P2a, P2b is the interest partial printing set, a nozzle NZ on the upstream-most at the head positions P2a, P2b is arranged on the upstream side with respect to the pressing reference position RL. Thus, the excess amount VO indicated in FIG. 5 is calculated. The unit of the excess amount VO is, for example, the number (quantity) of the raster line(s).

In a case that the upstream-most nozzle is same as the pressing reference position RL, or that the upstream-most nozzle is arranged at the downstream side with respect to the pressing reference position RL, the excess amount VO is 0 (zero). In the example of FIG. 5, in a case that the partial printing set executed at the head positions P0a, P0b or the partial printing set executed at the head positions P1a, P1b is the interest partial printing set, the upstream-most nozzle in the head positions P0a, P0b or the head positions P1a, P1b is arranged on the downstream side with respect to the pressing reference position RL, and thus the excess amount is 0 (zero).

In the processing of step S265, the CPU 210 sets a nozzle shift amount NS of a partial printing set to be performed next to the interest partial printing set (next partial printing set), based on the excess amount VO. The nozzle shift amount NS indicates a number (quantity) of nozzle(s) NZ which is included in the usable nozzles and which is not used on the downstream side (also referred to as a "downstream-side non-used nozzle") in the next partial printing set to be performed next to the interest partial printing set. In a case that the nozzle shift amount NS is 0 (zero), the downstream-side non-used nozzle is not provided or set. In a case that the nozzle shift amount NS is not less than 1 (one), a nozzle(s) NZ on the downstream side (+Y side in FIG. 5) of which number (quantity) corresponds to the nozzle shift amount NS is (are) the downstream-side non-used nozzle(s). Accordingly, in this case, a nozzle, which is included in the usable nozzles and which is different from the downstream-side non-used nozzle is a used nozzle to be used in the next partial printing set to be performed next to the interest partial printing set. Specifically, the CPU 210 sets the nozzle shift amount NS to be the excess amount VO in the processing of step S265.

In a case that the interest partial printing set is the partial printing set to be executed at the end part-pressing head position (step S252: YES), the CPU 210 sets, in the processing of step S272, the nozzle shift amount NS to be 0 (zero). In the case that the interest partial printing set is the partial printing set which is to be executed at the end part-pressing head position, the next partial printing set becomes to be the last partial printing set. The reason for this is that, in the last partial printing set, the non-used nozzle is not set for the downstream end of the usable nozzle.

In the processing of step S280, the CPU 210 determines, based on the nozzle shift amount NS, the conveying amount of the sheet conveyance to be performed after the interest partial printing set, in other words, the prior-set conveying amount TL of the sheet conveyance to be performed immediately before the next partial printing set after the interest partial printing set. The prior-set conveying amount TL is calculated with the raster line as the unit. The prior-set conveying amount TL is determined to be a value obtained by deducting, from the maximum length NL in the conveying direction AR which is printable in one partial printing set, the number (quantity) of the raster line(s) corresponding to the end area, the conveying amount $\Delta TL$ and the nozzle shift amount NS. In the present embodiment, since the maximum length NL is $(2D-\Delta TL)$ and the number (quantity) of the raster line(s) corresponding to the end area is the length H in the conveying direction AR of the end area, the prior-set conveying amount TL is $(2D-H-2\Delta TL-NS)$.

In the processing of step S285, the CPU 210 sets the number indicating the corresponding nozzle of the partial printing set next to the interest partial printing set to be an initial value. The initial value is a number indicating a nozzle which is included in the usable nozzles of the partial printing set and which is arranged on the upstream side, by an amount corresponding to the nozzle shift amount NS, from the downstream end. After the processing of step S285, the CPU 210 returns to the processing of step S200.

The printing of the present embodiment, as explained above, will be further explained with reference to FIG. 5. In the partial printing set which is executed before the partial printing set executed at the head positions P3a, P3b, which is the end-pressing head position, it is preferred to use all the usable nozzles so as to realize a high-speed printing. For this purpose, the nozzle shift amount NS of the partial printing set to be executed at the head positions P1a, P1b and the nozzle shift amount NS of the partial printing se to be executed at the head positions P2a, P2b are each set to 0 (zero) (step S265 of FIG. 6B), and the prior-set conveying amount TL of each of the sheet conveyances T0b and T1b which are immediately before these partial printing sets, respectively, is set to be $TL=(2D-H-2\Delta TL)$ (step S280 of FIG. 6B). Further, it is preferred, that the last partial printing set executed at the head positions P4a, P4b is executed in a state that the length from the downstream roller pair 141 to the upstream end of the sheet M is as short as possible. Thus, the last partial printing set executed at the head positions P4a, P4b is executed by using the nozzle on the downstream side of (in) the head positions P4a, P4b. For this purpose, the nozzle shift amount NS of the last partial printing set is set to be 0 (zero) (step S272 of FIG. 6B), and the conveying amount TL of the sheet conveyance T3b immediately before the last partial printing set is set to be $TL=(2D-H-2\Delta TL)$ (step S280 of FIG. 6B).

The head positions P3a, P3b each of which is the end-pressing head position are each a position in the conveying direction AR which is fixed with respect to the sheet M. Therefore, the nozzle shift amount NS of the partial printing set to be executed at the head positions P3a, P3b is set depending on the position in the conveying direction AR of the head position P2b (step S255, step S265 of FIG. 6B), and the conveying amount TL of the sheet conveyance T2b immediately before the partial printing set to be executed at the head positions P3a, P3b is determined (step S280 of FIG. 6B). Accordingly, except for such a case that the head position P2b with respect to the sheet M is accidentally on the downstream side with respect to the end-pressing head position, by an amount corresponding to $(2D-H-2\Delta TL)$, the nozzle shift amount NS of the partial printing set at the head positions P3a, P3b is set to be a value greater than 0 (zero), and the conveying amount TL of the sheet conveyance T2b is determined to be a value smaller than $(2D-H-2\Delta TL)$.

<Print Data Outputting Processing for Bar-code Printing Mode>

Figure 8:
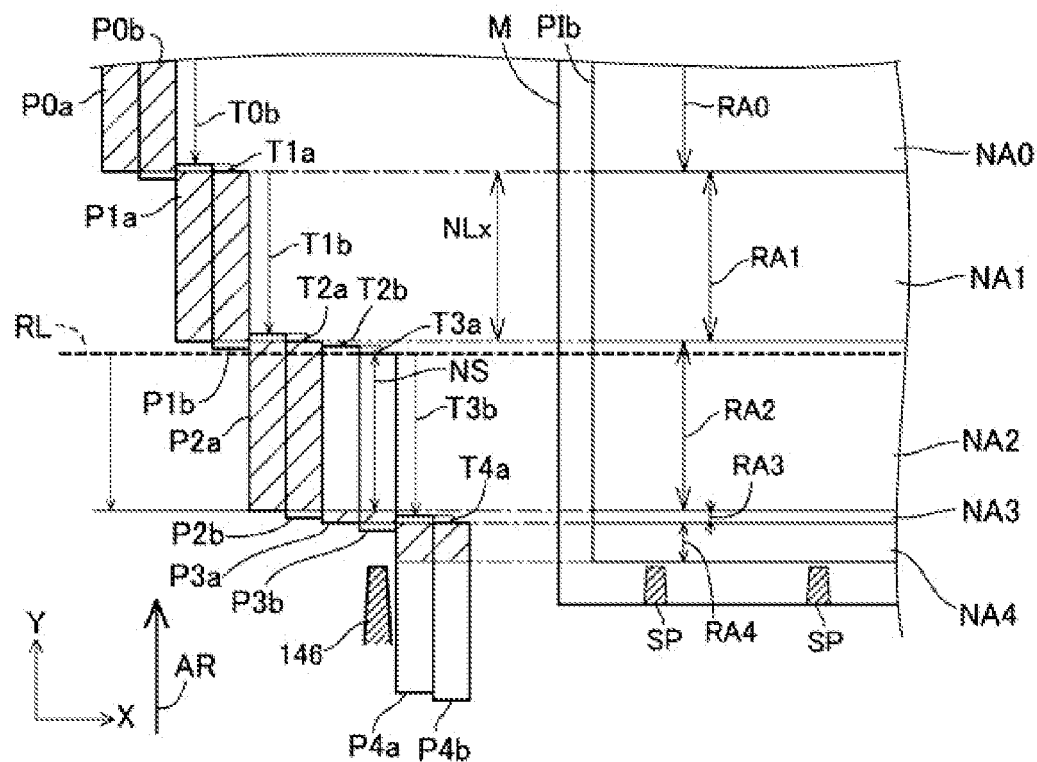
FIG. 8 is an explanatory view of printing in a bar-code printing mode.

Next, the print data outputting processing for the bar-code printing mode in step S160 of FIG. 3 will be explained. FIG. 8 depicts an explanatory view which is similar to that of FIG. 5, regarding the printing in the bar-code printing mode. The bar-code printing mode is different from the normal printing mode of FIG. 5 in view of that any end area is not provided on a print image PIb. Due to this, in FIG. 8, a print image PIb to be formed on the sheet M includes a plurality of normal areas (for example, areas NA0 to NA4 of FIG. 8) but does not include any end area.

Accordingly, in the bar-code printing mode, an area RA0 printed by a partial printing set executed at the head positions P0a, P0b is printed only by the partial printing set executed at the head positions P0a, P0b, but is not printed by another partial printing set different from the partial printing set executed at the head positions P0a, P0b. Similarly, an area RA1 is printed only by a partial printing set executed at the head positions P1a, P1b. An area RA2 is printed only by a partial printing set executed at the head positions P2a, P2b. An area RA3 is printed only by a partial printing set executed at the head positions P3a, P3b. An area RA4 is printed only by a partial printing set executed at the head positions P4a, P4b.

The reason for not providing the end area in the bar-code printing mode will be explained below. In a one-dimensional code such as a bar code, etc., and/or a two-dimensional code such as a "QR Code (the registered trademark), the contents of the information indicated by each of these codes is different depending on the thickness of and/or the spacing distance between lines and/or blocks constructing each of these codes. Due to this, it is important that the thickness of and/or the spacing distance between lines and/or blocks constructing the codes are printed with a high precision in the print image. In an end area, since dots on one raster line is printed by a partial printings performed a plurality of times (a plurality of partial printings), there is sometimes such a case that dots formed in a partial printing of the partial printings are deviated, in the conveying direction AR, from the dots formed in another partial printing of the partial printings. In such a case, the thickness of the line expressed by one raster line varies or fluctuates, which in turn might lead to such a possibility that the thickness of and/or the spacing distance between lines and/or blocks constructing the code to be printed might vary. Due to this, any end area is not provided on the bar-code printing mode of the present embodiment.

Note that also in the bar-code printing mode, two raster lines which are included in a plurality of raster lines within a normal area and arranged side by side in the conveying direction AR, and which are adjacent to each other (two raster lines which are continuous in the conveying direction AR) are printed, respectively, by two mutually different partial printings. For example, an odd-numbered raster line, which is included in the plurality of raster lines within a normal area and arranged side by side in the conveying direction AR, is printed by a preceding partial printing constructing the partial printing set, and an even-numbered raster line, which is included in the plurality of raster lines within the normal area and arranged side by side in the conveying direction AR, is primed by a succeeding partial printing constructing the partial printing set. Accordingly, the print resolution in the conveying direction AR of the print image PIb of the bar-code printing mode is same as the print resolution in the conveying direction AR of the print image PI of the normal printing mode.

Further, an intra-set conveying amount $\Delta TLx$ of the bar-code printing mode (for example, a conveying amount of each of sheet conveyances T1a, T2a, T3a, T4a in FIG. 8) is smaller than the intra-set conveying amount $\Delta TL$ of the normal printing mode (in the present embodiment, 7 (seven)) ($\Delta TL > \Delta TLx$). In the present embodiment, the intra-set conveying amount $\Delta TLx$ of the bar-code printing mode is 3 (three), with the raster line as the unit.

Since the intra-set conveying amount $\Delta TLx$ of the bar-code printing mode is smaller than the intra-set conveying amount $\Delta TL$ of the normal printing mode, a number (quantity) of usable nozzles in the bar-code printing is greater than that of the normal printing mode. Accordingly, a length NLx (FIG. 8) in the conveying direction AR printable in one partial printing set in the bar-code printing mode is (2D−$\Delta TLx$), and is longer than the length NL (FIG. 5. (2D−$\Delta TL$) in the conveying direction AR printable in one partial printing set in the normal printing mode (NLx>NL).

As described above, in the bar-code printing mode, the length NLx in the conveying direction AR printable in one partial printing set is long and the end area is not provided, thereby making the number of time(s) of the partial printing required for printing the print image to be smaller than that in the normal printing mode. Due to this, in the bar-code printing mode, the printing time may be shortened than the printing time of the normal printing mode.

The print data outputting processing for the bar-code printing mode is executed in a similar manner to the print data outputting processing for the normal printing mode depicted in FIGS. 6A and 6B. Note, however, that in the bar-code printing mode, the end area is not provided as described above, and thus there is no determination in the processing of step S205 of FIG. 6A as to whether or not the interest raster data is an object of division. Accordingly, in the bar-code printing mode, after the processing of step S205 of FIG. 6A, the procedure is proceeded to step S210 of FIG. 6A, without exception, and thus the processings of steps S215 to S230 of FIG. 6A will not be executed. Further, in the normal printing mode, in the processing of step S280 of FIG. 6B, the prior-set conveying amount TL is determined by the expression: (2D−H−2$\Delta TL$−NS). In the bar-code printing, since the end area is not provided, H=0 (zero) is satisfied and the intra-set conveying amount is $\Delta TLx$, the prior-set conveying amount TL is determined, in the processing of step S280 of FIG. 6B, by an expression; (2D−2$\Delta TLx$−NS).

The reason for setting, in the present embodiment as described above, the intra-set conveying amount $\Delta TL$ of the normal printing mode to be greater than the intra-set conveying amount $\Delta TLx$ of the bar-code printing mode will be explained. In the example of FIG. 5, the positions in the conveying direction AR of the head positions P2a, P2b and the positions in the conveying direction AR of the head positions P3a, P3b each of which is the end-pressing head position are relatively apart from each other. Here, the positions in the conveying direction AR of the head positions P2a, P2b vary due to, for example, a margin on the downstream side of the print image PI (the +Y side in FIG. 5), the length in the conveying direction AR of the sheet M, etc. Further, in a case that there is a blank part in an intermediate location or part in the conveying direction AR of the print image PI and that the printing is performed while skipping the blank part, the positions in the conveying direction AR of the head positions P2a, P2b vary, depending on the blank part included in the print image PI. Accordingly, there is such a case that the positions in the conveying direction AR of the head positions P2a, P2b and the positions in the conveying direction AR of the head positions P3a, P3b each of which is the end-pressing head position are close to each other. Regarding the printing in such a case, an explanation will be given while comparing the present embodiment with a reference embodiment.

Figure 9A:
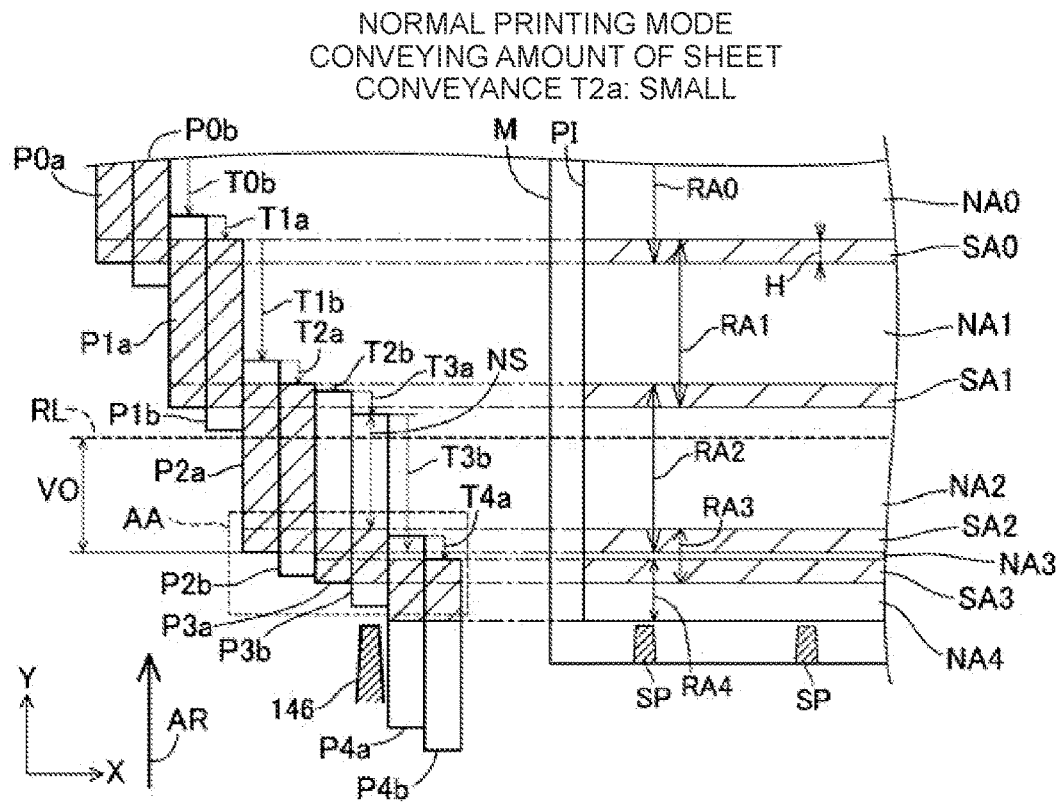
FIGS. 9A and 9B are each a second explanatory view of printing in the normal printing mode.
Figure 9B:
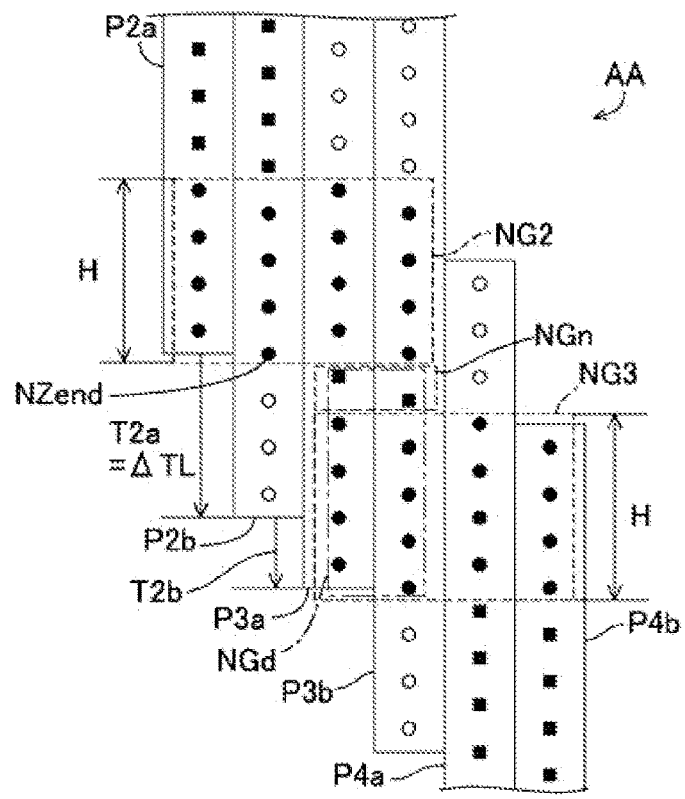
Figure 10A:
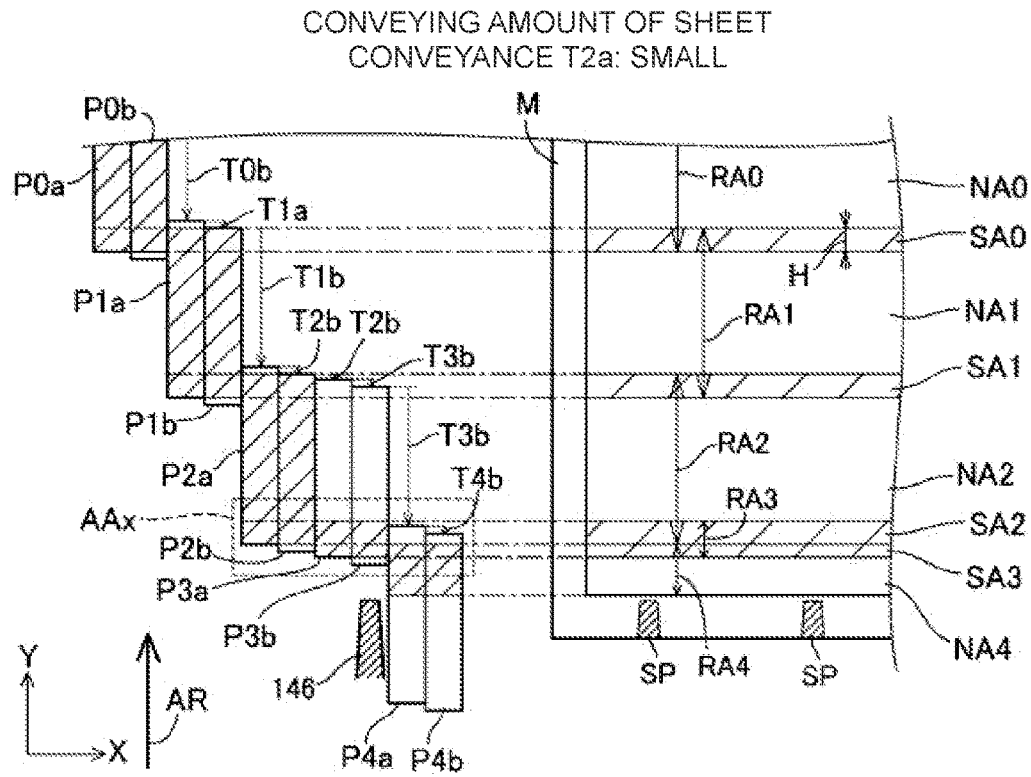
FIGS. 10A and 10B are each an explanatory view of a reference embodiment of the normal printing mode.
Figure 10B:
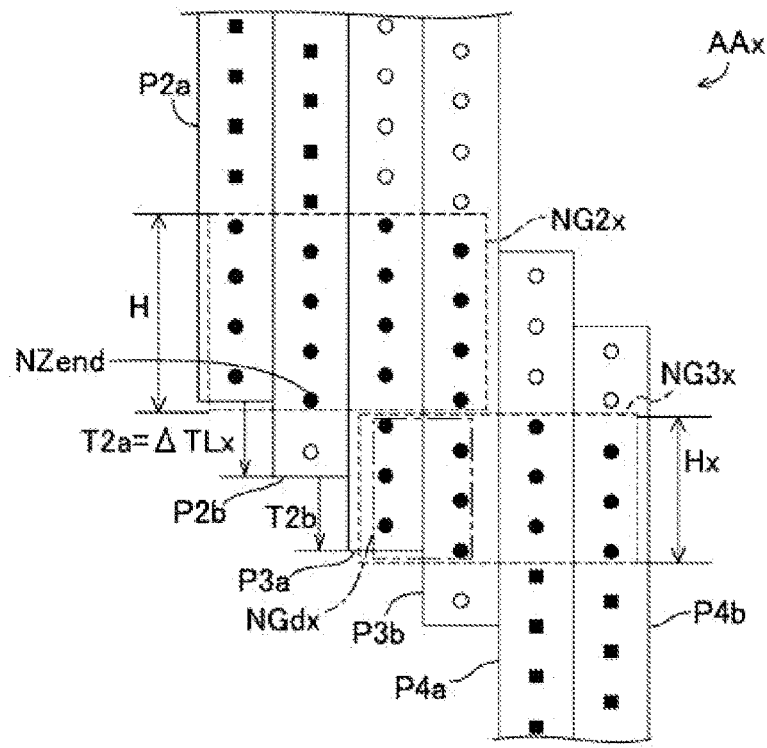

FIGS. 9A and 9B are each a second explanatory view of the printing in the normal printing mode of the first embodiment. FIGS. 10A and 10B are each an explanatory view of a reference embodiment of the printing in the normal printing mode. FIG. 9A indicates the explanatory view, of the present embodiment, which is similar to that of FIG. 5, regarding the case that the positions in the conveying direction AR of the head positions P2a, P2b and the positions in the conveying direction AR of the head positions P3a, P3b each of which is the end-pressing head position are close to each other. FIG. 10A indicates the explanatory view of the reference embodiment, regarding the case that the positions in the conveying direction AR of the head position P2a, P2b and the positions in the conveying direction AR of the head positions P3a, P3b each of which is the end-pressing head position are close to each other. In the reference embodiment, the intra-set conveying amount is set to be the intra-set conveying amount ΔTLx of the bar code printing mode, unlike in the present embodiment.

In the example depicted in FIGS. 9A, 9B, 10A, 10B, since the positions in the conveying direction AR of the head positions P2a, P2b and the positions in the conveying direction AR of the head positions P3a, P3b each of which is the end-pressing head position are close to each other, the sheet conveyance T2b is set to be "3" (corresponding to 3 pieces of the raster line, i.e., three raster lines) (step S280 of FIG. 6B). In such a case, in the present embodiment (FIGS. 9A and 9B), both of the length in the conveying direction AR of the end area SA2 and the length in the conveying direction AR of the end area SA3 can be secured by the amount corresponding to the length H (corresponding to H pieces of the raster line) to be secured as the length of the end area. In the reference embodiment (FIGS. 10A and 10B), although the length in the conveying direction AR of the end area SA2 is secured by the amount corresponding to the length H which is to be secured, the length in the conveying direction AR of the end area SA3 becomes to be smaller than the length H which is to be secured.

FIG. 9B is an enlarged view of an area AA surrounded by broken lines in FIG. 9A. FIG. 10B is an enlarged view of an area AAx surrounded by broken lines in FIG. 10A. In FIGS. 9B and 10B, each of circles and squares indicated inside the head positions P2a and P2b, P3a and P3b and P4a and P4b indicates a nozzle NZ. A solid circle indicates a nozzle NZ printing the end area. A square (solid square) indicates a nozzle NZ printing the normal area. A hollow circle indicates a non-used nozzle NZ.

In the present embodiment of FIG. 9A, a nozzle group NG2 at the head positions P2a, P2b and P3a, P3b is a nozzle group printing the end area SA2. A nozzle group NG3 at the head positions P3a, P3b and P4a, P4b is a nozzle group printing the end area SA3. A nozzle group NGn at the head positions P3a, P3b is a nozzle group printing the normal area NA3. Each of the nozzle groups NG2 and NG3 includes the nozzle NZ of which number (quantity) corresponds to the length H (in the present embodiment, 8 pieces of the raster line) which is to be secured in the conveying direction AR. Namely, in the present embodiment of FIG. 9B, the length in the conveying direction AR of each of the end area SA2 and the end area SA3 can be secured by the amount corresponding to the length H which is to be secured.

This is because the intra-set conveying amount ΔTL is set to be a value obtained by deducting the minimum amount TLmin of the prior-set conveying amount TL from the width H in the conveying direction AR of each of the end areas SA0 to SA3 (ΔTL=(H-TLmin); 7 (seven) in the present embodiment), Namely, in the present embodiment, since the intra-set conveying amount ΔTL is set to be 7 (seven), it is possible to secure not less than 8 (eight) pieces of the nozzle (a nozzle group NGd of FIG. 9B), which are to be used for the printing at the head positions P3a, P3b, on the upstream side (on the lower side of FIG. 9B) with respect to a nozzle NZend at an end on the upstream end (at an end on the lower side of FIG. 9B) which is used for the printing at the head positions P2a, P2b, regardless of the conveying amount of the sheet conveyance T2b. In the example depicted in FIG. 9B, since the conveying amount of the sheet conveyance T2b is 3 (three), the nozzle group NGd (FIG. 9B) includes 10 pieces of the nozzle. From FIG. 9B, it is appreciated that even in a case that the conveying amount of the sheet conveyance T2b is 1 (one), 8 pieces of the nozzle are at least secured. In a case that the eight pieces of the nozzle are secured, it is possible to print the end area SA3 including 8 raster lines.

In other words, in the present embodiment, the intra-set conveying amount ΔTL is determined so that a number (quantity) of an upstream-side raster line which is included in the raster lines printable in the partial printing set at the head positions P3a, P3b and which is arranged on the upstream side with respect to the raster lines printable in the partial printing set at the head positions P2a, P2b becomes to be not less than the number (quantity) H (H pieces) of the raster line to be printed in the end area SA3, even in a case that the conveying amount of the sheet transfer T2b is set to be a minimum value (1 (one) in the present embodiment). As a result, since it is possible to sufficiently secure the length in the conveying direction AR of the end area SA3, it is possible to execute the printing of an appropriate end area SA3 as explained with reference to FIGS. 7A and 7B, and thus to suppress the occurrence of such a situation that the banding becomes conspicuous in the print image PI.

Note that in the example of FIG. 9B, since the nozzle group NGd (FIG. 9B) includes 10 pieces of the nozzle, 8 pieces of the nozzles on the upstream side among the 10 pieces of the nozzle (nozzles belonging to the nozzle group NG3 of FIG. 9B) are used so as to print the end area SA3. Further, the remaining two nozzles (nozzles belonging to the nozzle group NGn of FIG. 9B) are used so as to print the end area SA2. In a case that the conveying amount of the sheet conveyance T2b is 1 (one), 8 pieces of the nozzle are secured, and thus these 8 pieces of the nozzle are used so as to print the end area SA3, but the normal area NA3 is not printed. Namely, in this case, the end area SA2 and the end area SA3 are directly adjacent to each other, and any normal area is not present between the end area SA2 and the end area SA3, As described above, although the area RA3 printed by the partial printings executed at the head positions P3a, P3b includes at least the end area SA2 and the end area SA3, there might be such a case that the area RA3 includes an normal area between the end area SA2 and the end area SA3 (FIG. 9) and also such a case that the area RA3 does not include any normal area between the end area. SA2 and the end area SA3 (not depicted in the drawings).

In a reference embodiment of FIG. 10B, the intra-set conveying amount ΔTLx is smaller than the intra-set conveying amount ΔTL of the present embodiment. Due to this, in FIG. 10B, only 6 (six) pieces of the nozzle (a nozzle group NGdx of FIG. 10B) can be secured, as the nozzles to be used for the printing at the head positions P3a and P3b, on the upstream side with respect to a nozzle NZend on the upstream end which is used for the printing at the head positions P2a, P2b. In a case that the conveying amount of the sheet conveyance T2b is the minimum value (1 (one) in the present embodiment), the number (quantity) of the nozzle which can be secured becomes further smaller which is only 4 pieces. Accordingly, in the reference embodiment of FIG. 10B, in a case that the conveying amount of the sheet conveyance T2b is small, the length in the conveying direction AR of the end area SA3 becomes to be "Hx" which is smaller than the length H to be secured. Accordingly, in the reference embodiment, since it is not possible to execute the printing of an appropriate end area SA3 as explained with reference to FIGS. 7A and 7B, and thus there is such a possibility that the banding might become conspicuous in the end area SA3.

Further, according to the present embodiment, the intra-set conveying amount ΔTLx in the bar-code printing mode is smaller than the intra-set conveying amount ΔTL in the normal printing mode. As a result of this, it is possible to set an appropriate intra-set conveying amount, in accordance with the printing mode. For example, due to this, the number (quantity) of the nozzle to be used in the partial printing set executed at the head positions P1a, P1b in the bar-code printing mode can be made greater than the number (quantity) of the nozzle to be used in this partial printing set in the normal printing mode (NLx>NL). Accordingly, the printing time in the bar-code printing mode may be shortened as compared with the printing time in the normal printing mode.

As appreciated from the foregoing explanation, in the present embodiment, two times of the partial printing executed at the head positions P1a, P1b in the normal printing mode are each an example of a "first partial printing", two times of the partial printing executed at the head positions P2a, P2b in the normal printing mode are each an example of a "second partial printing". Two times of the partial printing executed at the head positions P3a, P3b in the normal printing mode are each an example of a "third partial printing", and two times of the partial printing executed at the head positions P4a, P4b in the normal printing mode are each an example of a "fourth partial printing". Further, the end areas SA1, SA2, SA3 and SA4 in the normal printing mode are examples, respectively, of a "first end area", a "second end area", a "third end area", and a "fourth end area". Furthermore, the normal areas NA1, NA2, NA3 and NA4 in the normal printing mode are examples, respectively, of a "first normal area", a "second normal area", a "third normal area", and a "fourth normal area". Moreover, the conveying amount of the sheet conveyance T1b in the normal printing mode is an example of a "first conveying amount", and the conveying amount of the sheet conveyance T2b in the normal printing mode is an example of a "second conveying amount". Further, the end-pressing head position is an example of a "specified position". Two times of the partial printing executed at the head positions P1a, P1b in the bar-code printing mode are each an example of a "fifth partial printing", two times of the partial printing executed at the head positions P2a, P2b in the bar-code printing mode are each an example of a "sixth partial printing". Two times of the partial printing executed at the head positions P3a, P3b in the bar-code printing mode are each an example of a "seventh partial printing", two times of the partial printing executed at the head positions P4a, P4b in the bar-code printing mode are each an example of an "eighth partial printing".

Second Embodiment

In the first embodiment, one partial printing set includes two times of the partial printing (two partial printings). In a second embodiment, one partial printing set includes three times of the partial printing (three partial printings). FIGS. 11A, 11B and 11C are an explanatory view of the partial priming sets of the second embodiment. Each of FIGS. 11A to 11C depicts head positions of the two partial printing sets. A partial printing set constructed of three partial printings to be executed at head positions P2a, P2b and P2c, respectively, is a partial printing set which prints the area RA2 of FIG. 5. A partial printing set constructed of three partial printings to be executed at head positions P3a, P3b and P3c, respectively, is a partial printing set which prints the area RA3 of FIG. 5.

In the second embodiment, since one partial printing set includes three partial printings, two times of intra-set conveyance (two intra-set conveyances) are executed while one partial printing set is being executed. In FIGS. 11A to 11C, sheet conveyances T2a and T2b which are executed after the head positions P2a and P2b, respectively, are intra-set conveyances of the partial printing set executed at the head positions P2a, P2b and P2c. Sheet conveyances T3a and T3b which are executed after the head positions P3a and P3b, respectively, are intra-set conveyances of the partial printing set executed at the head positions P3a, P3b and P3c. A sheet conveyance T2c is a sheet conveyance performed between the partial printing set executed at the head positions P2a, P2b and P2c and the partial printing set executed at the head positions P3a, P3b and P3c.

A conveying amount of the intra-set conveyance of one partial printing set and a conveying amount of the intra-set conveyance of another partial printing set are made to be same. For example, the conveying amount of the sheet conveyance T2a and the conveying amount of the sheet conveyance T3a are same, and the conveying amount of the sheet conveyance T2b and the conveying amount of the sheet conveyance T3b are same. It is allowable that the two conveying amounts of two intra-set conveyances within one partial printing set are made different, under a condition that the conveying amounts conform to the following two rules (1) and (2). In a case that the two conveying amounts are set in such a manner, it is possible to appropriately perform the printing so that the raster lines are arranged side by side with a spacing distance which is one third the nozzle spacing distance NT (FIG. 2B).

Rule (1): A reminder obtained by dividing a sheet conveyance to be performed first (for example, the sheet conveyance T2a) among the two intra-set conveyances by a number of times (three times) of the partial printings included in one partial printing set is one of 1 (one) and 2 (two).

Rule (2): A reminder obtained by dividing a sum of the conveying amounts of sheet conveyances performed first and second (for example, the sheet conveyance T2a and the sheet conveyance T2b), respectively, in the two intra-set conveyances by the number of times (three times) of the partial printings included in one partial printing set is the other of 1 (one) and 2 (two).

Further, in the second embodiment, the conveying amounts of the two intra-set conveyances are determined so that the sum of the total of the conveying amounts of the two intra-set conveyances and a minimum value (1 (one) in the present embodiment) of the sheet conveyance T2c to be performed between the two partial printing sets becomes to be not less than the length H (6 (six) in the present embodiment) in the conveyance direction AR of the end area SA3 which is to be secured.

In the second embodiment, any one of conveying amounts of the intra-set conveyances depicted in FIGS. 11A to 11C is adopted. In FIG. 11A, the conveying amount of each of the sheet conveyances T2a and T3a is 2 (two), with the raster line as the unit; the conveying amount of each of the sheet conveyances T2b and T3b is 5 (five), with the raster line as the unit. The total of the sheet conveyances T2a and T2b, and the total of the sheet conveyances T3a and T3b are each 7 (seven).

In FIG. 11B, the conveying amount of each of the sheet conveyances T2a and T3a is 5 (five), with the raster line as the unit; the conveying amount of each of the sheet conveyances T2b and T3b is 2 (two), with the raster line as the unit. The total of the sheet conveyances T2a and T2b, and the total of the sheet conveyances T3a and T3b are each 7 (seven).

In FIG. 11C, the conveying amount of each of the sheet conveyances T2a and T3a is 4 (four), with the raster line as the unit; the conveying amount of each of the sheet conveyances T2b and T3b is 4 (four), with the raster line as the unit. The total of the sheet conveyances T2a and T2b, and the total of the sheet conveyances T3a and T3b are each 8 (eight).

According to the second embodiment, the conveying amounts of the two intra-set conveyances are determined so that the sum of the total of the conveying amounts of the two intra-set conveyances and the minimum value (1 (one) in the present embodiment) of the sheet conveyance T2c to be performed between the two partial printing sets becomes to be not less than the length H (6 (six) in the present embodiment) in the conveyance direction AR of the end area SA3 which is to be secured. Accordingly, it is possible to secure the length in the conveying direction AR of the end area SA3 to be the length H in the conveying direction AR which is to be secured. As a result, similarly to the first embodiment, it is possible to execute the printing of an appropriate end area SA3, and thus to suppress the occurrence of such a situation that the banding becomes conspicuous in the print image.

In each of FIGS. 11A to 11C, a nozzle group NG1 is a nozzle group which prints the end area SA1 (FIG. 5). A nozzle group NG2 is a nozzle group which prints the end area SA2 (FIG. 5). A nozzle group NG3 is a nozzle group which prints the end area SA3 (FIG. 5). Even in a case that the conveying amount of the sheet conveyance T2c is the minimum value (1 (one) in the present embodiment), each of the nozzle groups NG1, NG2 and NG3 includes 6 pieces of the nozzle of which positions in the conveying direction AR are mutually different. In such a manner, it is appreciated that, even in a case that the conveying amount of the sheet conveyance T2c is the minimum value (1 (one) in the present embodiment), the length in the conveying direction AR of each of the end areas SA1 to SA3 is secured.

Figure 12:
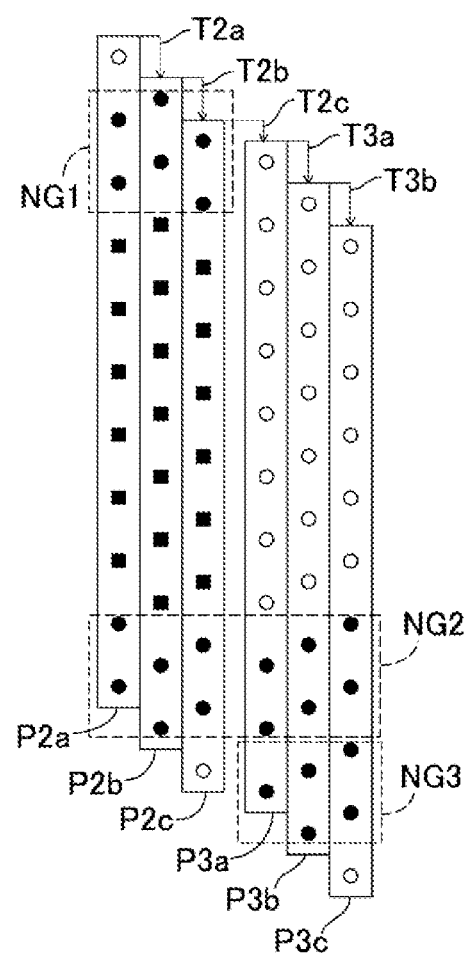
FIG. 12 is an explanatory view of a partial printing set of a reference embodiment.

FIG. 12 is an explanatory view of a partial printing set of a reference embodiment. In the reference embodiment of FIG. 12, the conveying amount of each of the sheet conveyances T2a and T3a is 2 (two) and the conveying amount of each of the sheet conveyances T2b and T3b is 2 (two), with the raster line as the unit. The total of the conveying amounts of the sheet conveyances T2a and T2b, and the total of the conveying amounts of the sheet conveyances T3a and T3b are each 4 (four). Namely, in the reference embodiment of FIG. 12, unlike the second embodiment of FIGS. 11A to 11C, the sum of the total ("4" in the reference embodiment) of the conveying amounts of the two intra-set conveyances and the minimum value (1 (one) in the reference embodiment) of the sheet conveyance T2c performed between the two partial printing sets is less than the length H (6 (six) in the present embodiment) in the conveying direction AR of the end area SR3 which is to be secured.

Accordingly, in the reference embodiment, in a case that the conveying amount of the sheet conveyance T2c is the minimum value (1 (one) in the reference embodiment), the nozzle group NG3 includes only 5 pieces of the nozzle of which positions in the conveying direction AR are mutually different. Namely, in the reference embodiment, it is appreciated that, in the case that the conveying amount of the sheet conveyance T2c is the minimum value (1 (one) in the reference embodiment), the length H in the conveying direction AR of the end area SA3 cannot be secured.

<Modifications>

In the above-described first embodiment, one partial printing set includes two partial printings; in the above-described second embodiment, one partial printing set includes three partial printings. Instead of this, it is allowable that one partial printing set is constructed of not less than four partial printings, for example, four or five partial printings. Generally, one partial printing set may be constructed of N times (N is an integer not less than 2). In such a case, N pieces of raster line which are included in the plurality of raster lines arranged side by side in the conveying direction within each of the normal areas and which are adjacent to each other are printed, respectively, by mutually different (N times of) partial printings which are included in one partial printing set. Further, while one partial printing set is being executed, (N−1) time(s) of the intra-set conveyance is/are executed. The conveying amount(s) of the (N−1) time(s) of the intra-set conveyance is/are determined so that the sum of the total of the conveying amount(s) of the (N−1) times of the intra-set conveyance and the minimum value of the conveying amount of the sheet conveyance between one partial printing set and a next partial printing set becomes to be not less than the length H in the conveying direction AR which corresponds to a number (quantity) of the raster line to be printed in the end area. Owing to this configuration, it is possible to secure the length in the conveying direction of the end area, and thus to suppress the occurrence of such a situation that the banding becomes conspicuous in the print image.

In the above-described first embodiment, the normal printing mode and the bar-code printing mode are provided as the printing mode. Instead of this, it is allowable that the normal printing mode and a high-speed printing mode are provided, as the printing mode. Further, in the high-speed printing mode, the printing in the bar-code printing mode of the first embodiment may be executed. Alternatively, it is allowable that the bar-code printing mode and/or the high-speed printing mode are not provided as the printing mode.

Further, although the intra-set conveying amount ΔTLx of the bar-code printing mode of the first embodiment is smaller than the intra-set conveying amount ΔTL of the normal printing mode, it is allowable that the intra-set conveying amount ΔTLx of the bar-code printing mode is made to be equal to the intra-set conveying amount ΔTL of the normal printing mode.

The printing processing in FIG. 4 and the print data outputting processing in FIGS. 6A and 6B are each an example, and the present disclosure is not limited to or restricted by these. For example, in the processing in each of FIG. 4 and FIGS. 6A and 6B, the entirety of the image data is converted into the print data (step S130 of FIG. 4), and then the print data outputting processing of FIGS. 6A and 6B is executed. Instead of this, it is allowable for example that the conversion of the print data is executed every time that the raster data is obtained in the processing of step S200 of FIG. 6A, with respect to each of the obtained raster data. Further, in the print data outputting processing, the raster data is allocated sequentially to the usable nozzles, and every time the allocation regarding one partial printing is completed, a group of allocated raster data is outputted as partial print data for one partial printing. Instead of this, it is allowable that the print data is divided and to generate a plurality of pieces of partial print data for all of the partial printings, and that after determining the conveying amounts for all of the sheet conveyances, the output of the plurality of pieces of partial print data for all of the partial printings and the output of the data of the conveying amounts are performed.

As the medium, another medium different from the sheet M, such as, for example, a film for OHP, a CD-ROM, a DVD-ROM, etc., may be adopted, instead of the sheet M.

In each of the above-described embodiments, the controller configured to execute the printing process in FIG. 4 is the CPU 210. Instead of this, the controller may be a device or apparatus of a different kind, for example, the terminal device 300 of an user. In such a case, for example, the terminal device 300 executes a driver program so as to function as a printer driver, and executes, as a part of the function as the printer driver, the printing process in FIG. 4. In such a case, the terminal device 300 causes the printer 200, as the printing part, to execute the printing by, for example, supplying the partial print data and the conveying amount data to the printer 200.

The controller configured to execute the printing process in FIG. 4 may be a server which obtains image data from the printer 200 and/or the terminal device 300, and to generate the partial print data and/or the conveying amount data as described above by using the obtained image data, and which transmits these pieces of the data to the printer 200. Such a server may be a plurality of calculators which are capable of communicating with each other via a network.

In each of the above-described embodiments, a part of the configuration realized by a hardware may be replaced by a software; on the contrary to this, a part or the entirety of the configuration realized by a software may be replaced with a hardware. For example, a processing or processings as a part of the print processing of FIG. 4 may be realized by a dedicated hardware circuit (for example, an ASIC) which is operated in accordance with an instruction from the CPU 210.

In the foregoing, although the present disclosure has been explained based on the embodiment and the modifications, the aspect of the present disclosure are provided for the purpose that the present disclosure can be easily understood, and is not intended to limit or restrict the present disclosure in any way. The present disclosure may be changed and/or improved without deviating from the gist and spirit of the present disclosure and the scope of the claims, and the range of the present disclosure may encompass any equivalent thereof.

What is claimed is:

1. A printer comprising:
   a printing part including:
      a conveyor configured to convey a medium in a conveying direction,
      a printing head including a plurality of nozzles from which an ink of a specified color is discharged and of which positions in the conveying direction are mutually different, the printing head being configured to discharge the ink from the plurality of nozzles to the medium so as to form dots in the medium, and
      a facing member configured to be capable of facing a print surface of the medium on an upstream side in the conveying direction with respect to the plurality of nozzles of the printing head; and
   a controller configured to cause the printing part to execute a partial printing of forming the dots by the printing head and a conveyance of the medium by the conveyor alternately and a plurality of times to thereby cause the printing part to print a print image,
   wherein in a case that the controller causes the printing part to print the print image, the controller is configured to execute:
      causing the printing head to execute a first partial printing N times (N being an integer not less than 2), the first partial printing being the partial printing executed in a state that the medium faces the facing member;
      causing the conveyor to convey the medium by a first conveying amount, after causing the printing head to execute the first partial printing the N times;
      causing the printing head to execute a second partial printing the N times, after causing the conveyor to convey the medium by the first conveying amount, the second partial printing being the partial printing executed in the state that the medium faces the facing member;
      causing the conveyor to convey the medium by a second conveying amount, which is smaller than the first conveying amount, after causing the printing head to execute the second partial printing the N times;
      causing the printing head to execute a third partial printing the N times, after causing the conveyor to convey the medium by the second conveying amount, the third partial printing being the partial printing executed in a state that the medium is arranged at a specified position in the conveying direction at which a predetermined position, of an end part on the upstream side in the conveying direction of the medium, faces the facing member;
      causing the conveyor to convey the medium, after causing the printing head to execute the third partial printing the N times; and
      then, causing the printing head to execute a fourth partial printing the N times, the fourth partial printing being the partial printing executed in a state that the medium does not face the facing member,
   wherein a first area printed by the first partial printing performed the N times includes a first normal area which is printed only by the first partial printing, and a first end area which is arranged on the upstream side in the conveying direction with respect to the first normal area and which is printed by both of the first partial printing and the second partial printing,
   wherein a second area printed by the second partial printing performed the N times includes the first end area, a second normal area which is arranged on the upstream side in the conveying direction with respect to the first end area and which is printed only by the second partial printing, and a second end area which is arranged on the upstream side in the conveying direction with respect to the second normal area and which is printed by both of the second partial printing and the third partial printing,
   wherein a third area printed by the third partial printing performed the N times includes the second end area and a third end area which is arranged on the upstream side in the conveying direction with respect to the second end area and which is printed by both of the third partial printing and the fourth partial printing,
   wherein a fourth area printed by the fourth partial printing performed the N times includes the third end area and a fourth normal area which is arranged on the upstream side in the conveying direction with respect to the third end area and which is printed only by the fourth partial printing, wherein N pieces of a first raster line, which are adjacent to each other and which are included in a plurality of first raster lines within the first normal area and arranged in the conveying direction, are printed, respectively, by the first partial printing and the first partial printing which are mutually different from each other and performed separately from each other, wherein N pieces of a second raster line, which are adjacent to each other and which are included in a plurality of second raster lines within the second normal area and arranged in the conveying direction, are printed, respectively, by the second partial printing and the second partial printing which are mutually different from each other and performed separately from each other, wherein N pieces of a third raster line, which are adjacent to each other and which are included in a plurality of third raster lines within the third normal area and arranged in the conveying direction, are printed, respectively, by the third partial printing and the third partial printing which are mutually different from each other and performed separately from each other, wherein N pieces of a fourth raster line, which are adjacent to each other and which are included in a plurality of fourth raster lines within the fourth normal area and arranged in the conveying direction, are printed, respectively, by the fourth partial printing and the fourth partial printing which are mutually different from each other and performed separately from each other, and wherein the controller is configured to execute:
performing a (N−1) time of the conveyance of the medium each between the N times of the first partial printing, between the N times of the second partial printing, between the N times of the third partial printing, and between the N times of the fourth partial printing; and determining a conveying amount of the (N−1) time of the conveyance of the medium so that a number of an upstream-side raster line which is included in a plurality of raster lines printable in the third partial printing performed the N times in a case that the second conveying amount is set to be a minimum value and which is arranged on the upstream side in the conveying direction with respect to a plurality of raster lines printable by the second partial printing performed the N times becomes to be not less than a number of raster lines to be printed in the first end area.

2. The printer according to claim 1, wherein the third area includes a third normal area which is arranged between the second end area and the third end area and which is printed only by the third partial printing.

3. The printer according to claim 2, wherein a certain area in which the upstream-side raster line included in the plurality of raster lines printable by the N times of the third partial printing includes at least the third end area including the upstream-side raster line of which number is same as the number of the raster lines to be printed in the first end area; and in a case that the number of the upstream-side raster line is greater than the number of the raster lines to be printed in the first end area, the certain area further includes the third normal area.

4. The printer according to claim 1, wherein the controller is configured to determine the conveying amount of the (N−1) time of the conveyance of the medium so that a sum of a total the conveying amount of the (N−1) time of the conveyance of the medium and the minimum value of the second conveying amount becomes to be not less than a length in the conveying direction which corresponds to the number of the raster lines to be printed in the first end area.

5. The printer according to claim 1, wherein the controller is configured to be capable of executing a printing in a first printing mode, and a printing in a second printing mode, wherein the print image is a first print image printed in the first printing mode, wherein in a case that the controller causes the printing part to print a second print image which is printed in the second printing mode, the controller is configured to execute:

causing the printing head to execute a fifth partial printing the N times, the fifth partial printing being the partial printing executed in the state that the medium faces the facing member;

causing the conveyor to convey the medium by a fifth conveying amount, after causing the printing head to execute the fifth partial printing the N times;

causing the printing head to execute a sixth partial printing the N times, after causing the conveyor to convey the medium by the fifth conveying amount, the sixth partial printing being the partial printing executed in the state that the medium faces the facing member;

causing the conveyor to convey the medium by a sixth conveying amount, which is smaller than the fifth conveying amount, after causing the printing head to execute the sixth partial printing the N times;

causing the printing head to execute a seventh partial printing the N times, after causing the conveyor to convey the medium by the sixth conveying amount, the seventh partial printing being the partial printing executed in the state that the medium is arranged at the specified position in the conveying direction at which the predetermined position, of the end part on the upstream side in the conveying direction of the medium, faces the facing member;

causing the conveyor to convey the medium, after causing the printing head to execute the seventh partial printing the N times; and then, causing the printing head to execute an eighth partial printing the N times, the eighth partial printing being the partial printing executed in the state that the medium does not face the facing member, and wherein a fifth area printed by the fifth partial printing performed the N times is printed only by the fifth partial printing, wherein a sixth area printed by the sixth partial printing performed the N times is printed only by the sixth partial printing, wherein a seventh area printed by the seventh partial printing performed the N times is printed only by the seventh partial printing, wherein an eighth area printed by the eighth partial printing performed the N times is printed only by the eighth partial printing, wherein N pieces of a fifth raster line, which are adjacent to each other and which are included in a plurality of fifth raster lines within the fifth area and arranged in the conveying direction, are printed, respectively, by the fifth partial printing and the fifth partial printing which are mutually different from each other and performed separately from each other, wherein N pieces of a sixth raster line, which are adjacent to each other and which are included in a plurality of sixth raster lines within the sixth area and arranged in the conveying direction, are printed, respectively, by the sixth partial printing and the sixth partial printing which are mutually different from each other and performed separately from each other, wherein N pieces of a seventh raster line, which are adjacent to each other and which are included in a plurality of seventh raster lines within the seventh area and arranged in the conveying direction, are printed, respectively, by the seventh partial printing and the seventh partial printing which are mutually different from each other and performed separately from each other, wherein N pieces of an eighth raster line, which are adjacent to each other and which are included in a plurality of eighth raster lines within the eight area and arranged in the conveying direction, are printed, respectively, by the eighth partial printing and the eighth partial printing which are mutually different from each other and performed separately from each other;

wherein the controller is configured to execute performing the (N−1) time of the conveyance of the medium each between the N times of the fifth partial printing, between N times of the sixth partial printing, between the N times of the seventh partial printing, and between the N times of the eighth partial printing, and wherein a conveying amount of the (N−1) time of the conveyance of the medium in the second printing mode is smaller than a conveying amount of the (N−1) time of the conveyance of the medium in the first printing mode.

6. The printer according to claim 5, wherein the number of a nozzle, among the plurality of nozzles, used in each of the fifth partial printing and the sixth partial printing in the second printing mode is greater than the number of a nozzle, among the plurality of nozzles, used in each of the first partial printing and the second partial printing in the first printing mode.

7. The printer according to claim 5, wherein the second print image printed in the second printing mode includes a code image which indicates at least one of a one-dimensional code and a two-dimensional code.

8. The printer according to claim 1, further comprising a carriage configured to mount the printing head thereon, and to scan with respect to the medium in a scanning direction orthogonal to the conveying direction,
wherein the controller is configured to execute the partial printing by causing the printing head to discharge the ink to the medium while causing the carriage to scan in the scanning direction.

9. A non-transitory, computer-readable medium storing a program fix a controller configured to control a printing part, the printing part including:
a conveyor configured to convey a medium in a conveying direction;
a printing head having a plurality of nozzles from which an ink of a specified color is discharged and of which positions in the conveying direction are mutually different, the printing head being configured to discharge the ink from the plurality of nozzles to the medium so as to form dots in the medium; and
a facing member configured to be capable of facing a print surface of the medium on an upstream side in the conveying direction with respect to the plurality of nozzles of the printing head, wherein the program causing a computer of the controller to realize printing of a print image by the printing part, by causing the printing part to execute a partial printing of forming the dots by the printing head and a conveyance of the medium by the conveyor alternately and a plurality of times;

in a case that the program causes the printing part to print the print image, the program is configured to execute:
causing the printing head to execute a first partial printing N times (N being an integer not less than 2), the first partial printing being the partial printing executed in a state that the medium faces the facing member;
causing the conveyer to convey the medium by a first conveying amount, after causing the printing head to execute the first partial printing the N times;
causing the printing head to execute a second partial printing the N times, after causing the conveyor to convey the medium by the first conveying amount, the second partial printing being the partial printing executed in the state that the medium faces the facing member;
causing the conveyor to convey the medium by a second conveying amount, which is smaller than the first conveying amount, after causing the printing head to execute the second partial printing the N times;
causing the printing head to execute a third partial printing the N times, after causing the conveyor to convey the medium by the second conveying amount, the third partial printing being the partial printing executed in a state that the medium is arranged at a specified position in the conveying direction al which a predetermined position, of an end part on the upstream side in the conveying direction of the medium, faces the facing member;
causing the conveyor to convey the medium, after causing the printing head to execute the third partial printing the N times; and
then, causing the printing head to execute a fourth partial printing the N times, the fourth partial printing being the partial printing executed in a state that the medium does not face the facing member, wherein a first area printed by the first partial printing performed the N times includes a first normal area which is printed only by the first partial printing, and a first end area which is arranged on the upstream side in the conveying direction with respect to the first normal area and which is printed by both of the first partial printing and the second partial printing, wherein a second area printed by the second partial printing performed the N times includes the first end area, a second normal area which is arranged on the upstream side in the conveying direction with respect to the first end area and which is printed only by the second partial printing, and a second end area which is arranged on the upstream side in the conveying direction with respect to the second normal area and which is printed by both of the second partial printing and the third partial printing, wherein a third area printed by the third partial printing performed the N times includes the second end area and a third end area which is arranged on the upstream side in the conveying direction with respect to the second end area and which is printed by both of the third partial printing and the fourth partial printing, wherein a fourth area printed by the fourth partial printing performed the N times includes the third end area and a fourth normal area which is arranged on the upstream side in the conveying direction with respect to the third end area and which is printed only by the fourth partial printing, wherein N pieces of a first raster line, which are adjacent to each other and which are included in a plurality of first raster lines within the first normal area and arranged in the conveying direction, are printed, respectively, by the first partial printing and the first partial printing which are mutually different from each other and performed separately from each other, wherein N pieces of a second raster line, which are adjacent to each other and which are included in a plurality of second raster lines within the second normal area and arranged in the conveying direction, are printed, respectively, by the second partial printing and the second partial printing which are mutually different from each other and performed separately from each other, wherein N pieces of a third raster line, which are adjacent to each other and which are included in a plurality of third raster lines within the third normal area and arranged in the conveying direction, are printed, respectively, by the third partial printing and the third partial printing which are mutually different from each other and performed separately from each other, wherein N pieces of a fourth raster line, which are adjacent to each other and which are included in a plurality of fourth raster lines within the fourth normal area and arranged in the conveying direction, are printed, respectively, by the fourth partial printing and the fourth partial printing which are mutually different from each other and performed separately from each other, and wherein the program is configured to cause the computer of the controller to realize:
  performing a (N−1) time of the conveyance of the medium each between the N times of the first partial printing, between N times of the second partial printing, between the N times of the third partial printing, and between the N times of the fourth partial printing; and
  determining a conveying amount of the (N−1) time of the conveyance of the medium so that the number of an upstream-side raster line which is included in a plurality of taster lines printable in the third partial printing performed the N times in a case that the second conveying amount is set to be a minimum value and which is arranged on the upstream side in the conveying direction with respect to a plurality of raster lines printable by the second partial printing performed the N times becomes to be not less than the number of raster lines to be printed in the first end area.

10. The non-transitory, computer-readable medium according to claim 9, wherein the third area includes a third normal area which is arranged between the second end area and the third end area and which is printed only by the third partial printing.

* * * * *

UNITED STATES PATENT AND TRADEMARK OFFICE
CERTIFICATE OF CORRECTION

PATENT NO. : 11,900,188 B2
APPLICATION NO. : 17/828187
DATED : February 13, 2024
INVENTOR(S) : Shingo Saito It is certified that error appears in the above-identified patent and that said Letters Patent is hereby corrected as shown below:

In the Claims

Column 29, Claim 1, Line 18 should read:
third raster lines within the third end area and Column 33, Claim 9, Line 26 should read:
third raster lines within the third end area and Signed and Sealed this
Twenty-third Day of April, 2024

Katherine Kelly Vidal
*Director of the United States Patent and Trademark Office*